(12) United States Patent
Banerjee et al.

(10) Patent No.: US 11,776,078 B2
(45) Date of Patent: Oct. 3, 2023

(54) SYSTEMS AND METHODS FOR GENERATING STRATEGIC COMPETITIVE INTELLIGENCE DATA RELEVANT FOR AN ENTITY

(71) Applicant: Tata Consultancy Services Limited, Mumbai (IN)

(72) Inventors: Utsab Banerjee, Kolkata (IN); Shekhar Guha, Kolkata (IN); Taruna Gupta, Kolkata (IN); Tara Prasad, Bangalore (IN)

(73) Assignee: Tata Consultancy Services Limited, Mumbai (IN)

(*) Notice: Subject to any disclaimer, the term of this patent is extended or adjusted under 35 U.S.C. 154(b) by 1111 days.

(21) Appl. No.: 15/405,999

(22) Filed: Jan. 13, 2017

(65) Prior Publication Data
US 2017/0365020 A1    Dec. 21, 2017

(30) Foreign Application Priority Data
Feb. 23, 2016    (IN) .............................. 201621006308

(51) Int. Cl.
*G06Q 50/18* (2012.01)
*G06F 7/02* (2006.01)
(Continued)

(52) U.S. Cl.
CPC .............. *G06Q 50/184* (2013.01); *G06F 7/02* (2013.01); *G06F 16/24558* (2019.01);
(Continued)

(58) Field of Classification Search
CPC ........ G06Q 50/184; G06Q 30/02–0206; G06F 16/95–9538
See application file for complete search history.

(56) References Cited

U.S. PATENT DOCUMENTS 5,794,210 A * 8/1998 Goldhaber ......... G06Q 30/0207
705/14.69
5,991,751 A * 11/1999 Rivette ................... G06F 16/34
(Continued)

OTHER PUBLICATIONS

Olston, C., Najork, M.: Web crawling. Foundations and Trends in Information Retrieval 4(3), 175-246 (2010) (Year: 2010).*
(Continued)

*Primary Examiner* — Charles Guiliano
*Assistant Examiner* — Scott M Ross
(74) *Attorney, Agent, or Firm* — Finnegan, Henderson, Farabow, Garrett & Dunner, LLP

(57) ABSTRACT

Strategic competitive intelligence data generation systems and methods are provided. The system stores internal intellectual property data of an entity, receives external technology development data from predefined sources and intellectual property data from the internal portfolio database of the entity, stores a set of relevant rules, executes them, filters the technology development data and the intellectual property data, based on the rules executed by the rule engine. It stores in one of an entity aligned cluster database, the filtered technology development data and the intellectual property data. The entity aligned cluster databases are created against predefined entity aligned clusters. The system executes an input query, determines one relevant entity aligned cluster database for executing the search query, and populates relevancy scores in two matrices, aggregates the relevancy scores through multiplication of the matrices. The system then analyses the resultant matrix based on set of rules and displays results of the analytics.

14 Claims, 28 Drawing Sheets

(51) Int. Cl.
*G06Q 30/0202* (2023.01)
*G06F 16/9535* (2019.01)
*G06F 16/2455* (2019.01)
*G06Q 10/063* (2023.01)

(52) U.S. Cl.
CPC ....... *G06F 16/9535* (2019.01); *G06Q 10/063* (2013.01); *G06Q 30/0202* (2013.01); *G06F 2216/03* (2013.01)

(56) References Cited

U.S. PATENT DOCUMENTS

| | | | | |
|---|---|---|---|---|
| 7,676,375 | B1* | 3/2010 | Neifeld | G06Q 50/184 705/306 |
| 7,797,373 | B1* | 9/2010 | Berger | G06Q 30/02 705/310 |
| 8,266,148 | B2 | 9/2012 | Guha et al. | |
| 8,447,758 | B1* | 5/2013 | Adler | G06F 16/24578 707/722 |
| 8,484,217 | B1* | 7/2013 | Srivastava | G06F 16/951 707/738 |
| 8,712,812 | B2 | 4/2014 | Snow et al. | |
| 8,719,308 | B2 | 5/2014 | Xiong et al. | |
| 2002/0042731 | A1 | 4/2002 | King, Jr. et al. | |
| 2004/0122841 | A1 | 6/2004 | Goodman et al. | |
| 2008/0114668 | A1* | 5/2008 | Peters | G06Q 10/06 705/310 |
| 2010/0223100 | A1* | 9/2010 | Lee | G06Q 10/0637 705/7.11 |
| 2011/0246379 | A1* | 10/2011 | Maddox | G06Q 50/18 715/764 |
| 2013/0086045 | A1* | 4/2013 | Lundberg | G06Q 40/08 707/722 |
| 2013/0086049 | A1* | 4/2013 | Lundberg | G06F 40/237 707/E17.014 |
| 2014/0289675 | A1* | 9/2014 | Stading | G06Q 10/10 715/810 |
| 2019/0294689 | A1* | 9/2019 | Mathur | G06F 16/23 |

OTHER PUBLICATIONS

Kinne, Jan und David Lenz (2019):, Predicting Innovative Firms Using Web Mining and Deep Learning, ZEW Discussion Paper No. 19-001, Mannheim (Year: 2019).*

Bashir S, Rauber A (2010) Improving retrievability of patents in prior-art search. In: Advances in Information Retrieval, Springer, pp. 457{470 (Year: 2010).*

* cited by examiner

SYSTEMS AND METHODS FOR GENERATING STRATEGIC COMPETITIVE INTELLIGENCE DATA RELEVANT FOR AN ENTITY

PRIORITY CLAIM

This U.S. patent application claims priority under 35 U.S.C. § 119 to: India Application No. 201621006308, filed on Feb. 23, 2016. The entire contents of the aforementioned application are incorporated herein by reference.

TECHNICAL FIELD

The embodiments herein generally relate to data management systems, and, more particularly, to systems and methods for aggregating technology development data with Intellectual property portfolio data of an entity and generating descriptive and predictive data pertaining to strategic competitive intelligence relevant for that entity.

BACKGROUND

Generation of strategic competitive Intelligence based on Intellectual property of an entity Is already known in the art. But none of the present solution provides a comprehensive solution to effectively fuse technology development data available in public domain with Intellectual Property (IP) data of an entity and generate descriptive and predictive data which would help users to take critical business decisions.

Another existing solution includes obtaining number of IP records, analyzing those records to obtain IP cluster(s) and allowing users to evaluate IP in terms of licensing, donation, infringement, monetization, and/or competitive intelligence opportunities using data visualization software/techniques.

Another existing solution provide a system that accesses a source of unstructured data and subsequently extracts data from the source utilizing a template to extract entity Instances into an entity instance table. A pattern generator then generates a pattern involving a key entity and one or more non-key entities associated with the key entity based on the entity instance table. However, this solution focuses on processing and analyzing unstructured data, but does not go further to generate competitive intelligence insights for a company or any other entity.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments In a simplified form as a prelude to the more detailed description that is presented below.

In an aspect, there is provided a hardware processor implemented method for generating strategic competitive intelligence data relevant for an entity, the method comprising storing, in an internal portfolio database, internal intellectual property data of the entity; receiving, by a data mining module, technology development data from one or more predefined sources, intellectual property data from the internal portfolio database; storing, in an entity rule database, a set of rules relevant for the entity; executing, by a rule engine, the set of rules; filtering, by the data mining module, the technology development data and the intellectual property data, based on, the set of rules executed by the rule engine; storing, in at least one of an entity aligned cluster database, the filtered technology development data and the intellectual property data, wherein entity aligned cluster databases are created against predefined entity aligned clusters; executing, by a query engine an Input search query received from a user; determining by an aggregator at least one relevant entity aligned cluster database for executing the input search query; populating, by the aggregator, relevancy scores in a first matrix specific to internal intellectual property data (PORTD matrix) and a second matrix specific to technology development data (EXTD matrix), based on output of said query engine, for each unique data set in a predetermined entity aligned cluster database; aggregating, by the aggregator, the relevancy scores using the EXTD matrix and PORTD matrix and generating output data (AGGD matrix); analyzing, by an analytics engine the AGGD matrix based on the set of rules, wherein output of the analytics engine is data describing the output of the aggregator, and predicting strategic competitive intelligence data relevant for the entity based on performed analysis; displaying, by a display unit, the output of the analytics engine.

In an embodiment the intellectual property data comprises of patent data, copyright data, design data, trademark data, trade secret data and geographical indication data.

In an embodiment the technology development data comprises of published patent documents, published technology related intellectual property documents, scientific and technology journal publications, technological product data.

In an embodiment said one or more predefined sources comprises of at least one of blogs, news feeds, audio, video websites, company reports, intellectual property database websites, and social media.

In an embodiment the technology development data and the intellectual property data received by the data mining module are generated by a method selected from a group consisting of crawling, by a web crawler through World Wide Web, receiving RSS feeds directly from a website, receiving, by an input module, any relevant data provided by an user, or any combination thereof.

In an embodiment the set of rules relevant for said entity comprises of whitelist and blacklist of websites, keywords pertaining to plurality of entity aligned clusters and context of data capturing.

In an embodiment receiving, by a data mining module, is performed periodically based on an interval defined by said entity and stored in the entity rule database.

In an embodiment the entity aligned cluster database consists of predefined matrices with dimensions and measures as data fields.

In an embodiment number of columns of PORTD matrix is equal to the number of types of intellectual property present in the internal portfolio database and number of columns of EXTD matrix is equal to number of rows of PORTD matrix.

In another aspect, there is provided a system for generating strategic competitive intelligence data relevant for an entity, the system comprising: a memory storing instructions; a processor communicatively coupled to said memory, wherein said processor Is configured by said instructions to: store, in an internal portfolio database, internal intellectual property data of the entity; receive, by a data mining module, technology development data from one or more predefined sources, intellectual property data from the internal portfolio database; store, in an entity rule database, a set of rules relevant for the entity; execute, by a rule engine, the set of rules; filter, by the data mining module, the technology development data and the intellectual property data, based on, the set of rules executed by the rule engine; store, in at least one of an entity aligned cluster database, the filtered technology development data and the intellectual property data, wherein entity aligned cluster databases are created against predefined entity aligned clusters; execute, by a query engine an input search query received from a user; determine, by an aggregator at least one relevant entity aligned cluster database for executing the input search query; populate, by the aggregator, relevancy scores in a first matrix specific to internal intellectual property data (PORTD matrix) and a second matrix specific to technology development data (EXTD matrix), based on output of said query engine, for each unique data set in a predetermined entity aligned cluster database; aggregate, by the aggregator, the relevancy scores using the EXTD matrix and PORTD matrix and generating output data (AGGD matrix); analyze, by an analytics engine, the AGGD matrix based on the set of rules, wherein output of the analytics engine is data describing the output of the aggregator, and predicting strategic competitive intelligence data relevant for the entity based on performed analysis; display, by a display unit, the output of the analytics engine.

In an embodiment the intellectual property data comprises of patent data, copyright data, design data, trademark data, trade secret data and geographical Indication data.

In an embodiment the technology development data comprises of published patent documents, published technology related intellectual property documents, scientific and technology journal publications, technological product data.

In an embodiment the one or more predefined sources comprises of at least one of blogs, news feeds, audio, video websites, company reports, intellectual property database websites, and social media.

In an embodiment the technology development data and the intellectual property data received by the data mining module are generated by a method selected from a group consisting of crawling, by a web crawler through World Wide Web, receiving RSS feeds directly from a website, receiving, by an input module, any relevant data provided by an user, or any combination thereof.

In an embodiment the set of rules relevant for said entity comprises of whitelist and blacklist of websites, keywords pertaining to plurality of entity aligned clusters and context of data capturing.

In an embodiment receiving, by a data mining module, is performed periodically based on an interval defined by said entity and stored in the entity rule database.

In an embodiment the entity aligned cluster database consists of predefined matrices with dimensions and measures as data fields.

In an embodiment number of columns of PORTD matrix is equal to the number of types of intellectual property present in the internal portfolio database and number of rows of EXTD matrix is equal to number of columns of PORTD matrix.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The words "comprising," "having," "containing," and "including," and other forms thereof, are intended to be equivalent in meaning and be open ended in that an item or items following any one of these words is not meant to be an exhaustive listing of such item or Items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Some embodiments of this disclosure, illustrating all its features, will now be discussed in detail. The disclosed embodiments are merely exemplary of the disclosure, which may be embodied in various forms.

Before setting forth the detailed explanation, it Is noted that all of the discussion below, regardless of the particular implementation being described, is exemplary in nature, rather than limiting. For example, although selected aspects, features, or components of the implementations are depicted as being stored in memories, all or part of the systems and methods consistent with the strategic competitive intelligence data generation system and method may be stored on, distributed across, or read from other machine-readable media.

Figure 1:
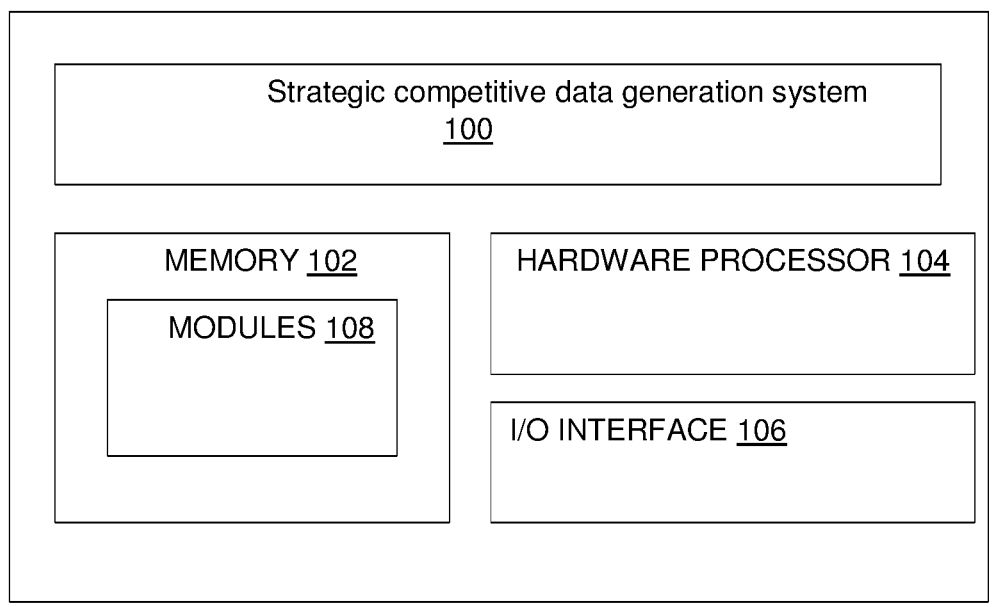
FIG. 1 is a block diagram of system for generating strategic competitive intelligence data according to an embodiment of the present disclosure.

FIG. 1 is a block diagram of a strategic competitive intelligence generation system 100 according to an embodiment of the present disclosure. The strategic competitive intelligence generation system 100 comprises a memory 102, a hardware processor 104, and an input/output (I/O) interface 106. The memory 102 further includes one or more modules 108 (or modules 108). The memory 102, the hardware processor 104, the input/output (I/O) interface 106, and/or the modules 108 may be coupled by a system bus or a similar mechanism.

The memory 102, may store instructions, any number of pieces of information, and data, used by a computer system, for example strategic competitive intelligence data generation system 100 to implement the functions (or embodiments) of the present disclosure. The memory 102 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, applications, instructions or the like for enabling the strategic competitive intelligence data generation and to carry out various functions in accordance with various example embodiments.

The hardware processor 104 may be implemented as one or more microprocessors, microcomputers, microcontrollers, digital signal processors, central processing units, state machines, logic circuitries, and/or any devices that manipulate signals based on operational instructions. Further, the hardware processor 104 may comprise a multi-core architecture. Among other capabilities, the hardware processor 104 is configured to fetch and execute computer-readable instructions or modules stored in the memory 102.

Figure 2:
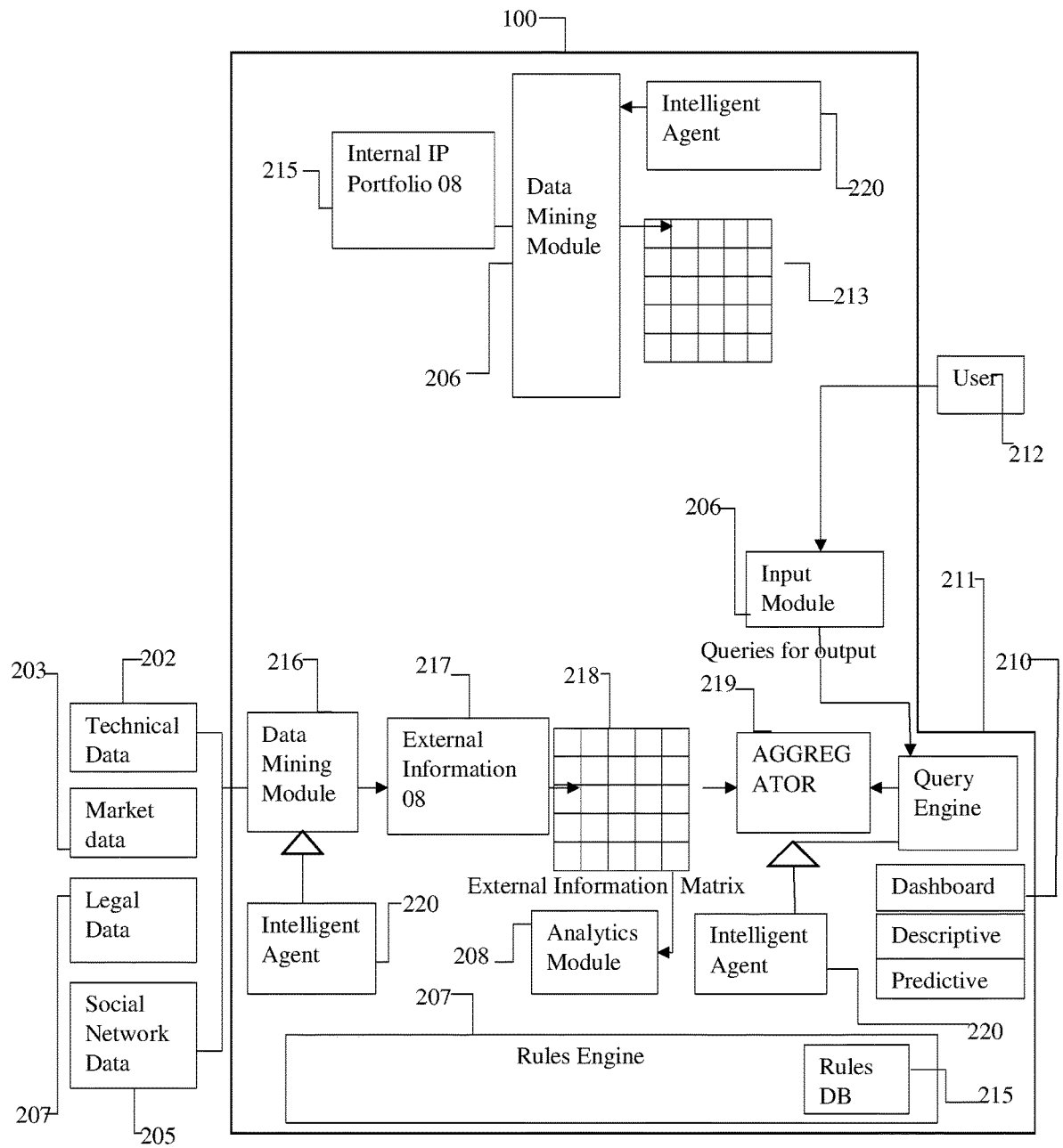
FIG. 2 is a representative system diagram for generating strategic competitive intelligence data in descriptive and predictive dashboards according to an embodiment of the present disclosure.

FIG. 2 is a representative system diagram 100 for generating strategic competitive intelligence data according to an embodiment of the present disclosure wherein external technology development data and Internal intellectual property portfolio data of an entity is effective stored, aggregated and analyzed to generate strategic competitive intelligence data relevant for the entity. The system 100 receives various kinds of data which has a technological component in it viz. Technical Data (data from technology websites, scientific journals) (202), Market Data (stock related data of technology companies, annual report of technology companies) (203), Legal Data (published patent documents, published technical design documents, technology related case laws, published technology license documents, reports from licenses and contracts) (204), Social Network Data (technology related blogs, technology related social network feeds) (205) and any other kind of technology related data from web pages. The data mining module 216 gathers these data 202-205 and stores it in an external information database 217. This data is further transformed and stored In external information matrix form 218. Similarly data of the entity's own internal intellectual property portfolio database 215 is transformed and stored in internal information matrix 213. When a user 212 of the system 100 inputs a query through input module 206, the query engine 211 executes said input and based on the output of the query engine 211, the aggregator module 219 aggregates data from external information matrix 218 and internal information matrix 213 and the Analytics Module 208 performs analysis of the aggregated data. The output of the analytics module 208 is displayed in descriptive and predictive output dashboard 210. During all the processing steps of the system 100, input from rule engine 207 which utilizes a rule database 209, is taken into consideration. Moreover an intelligent agent 220, helps the data mining module 216 in effective clustering of data and the query engine 211 to effectively execute an input query.

Figure 3:
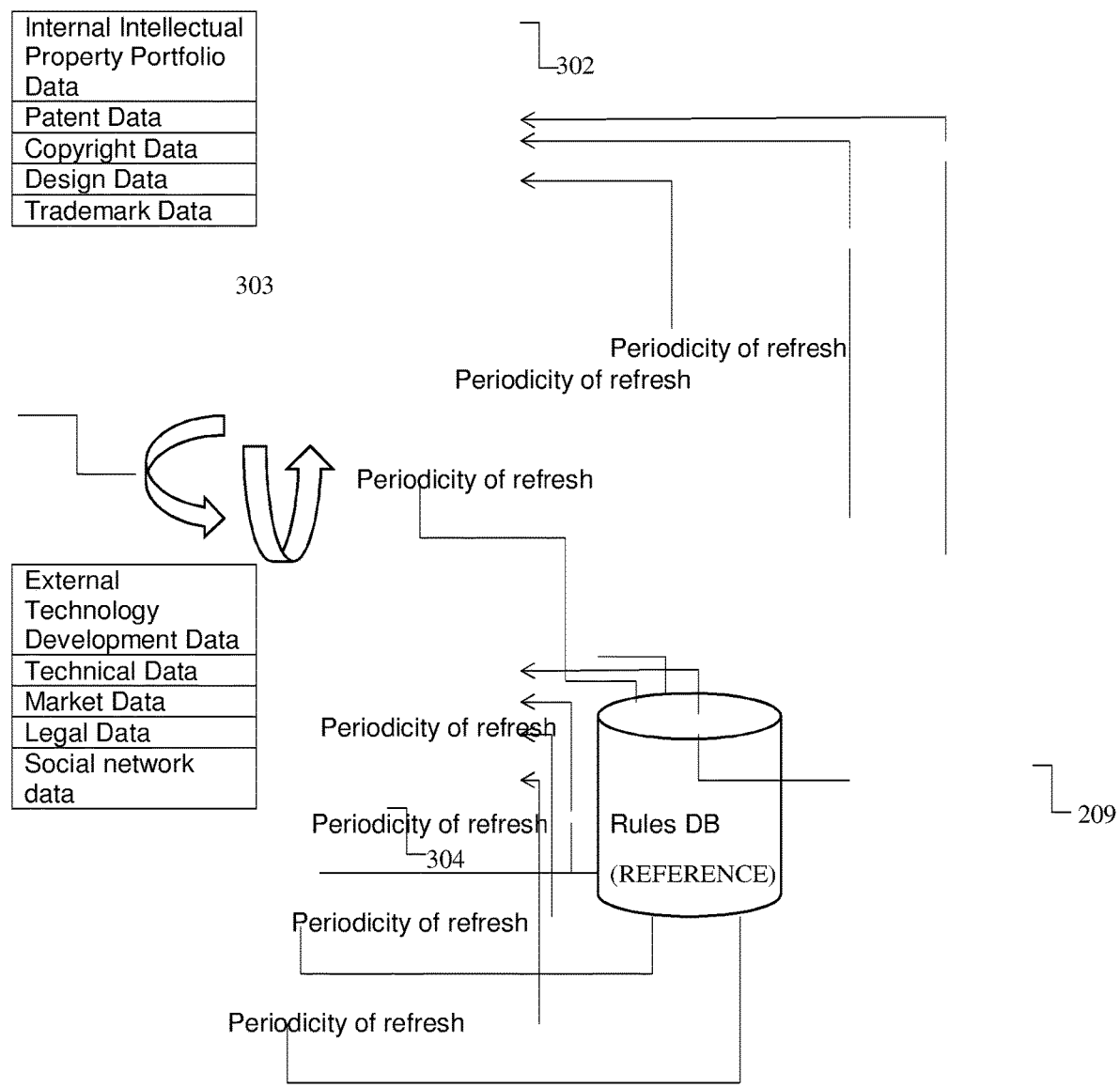
FIG. 3 depicts the periodicity in mining of external technology development data and internal Intellectual property portfolio data according to an embodiment of the present disclosure.
Figure 11:
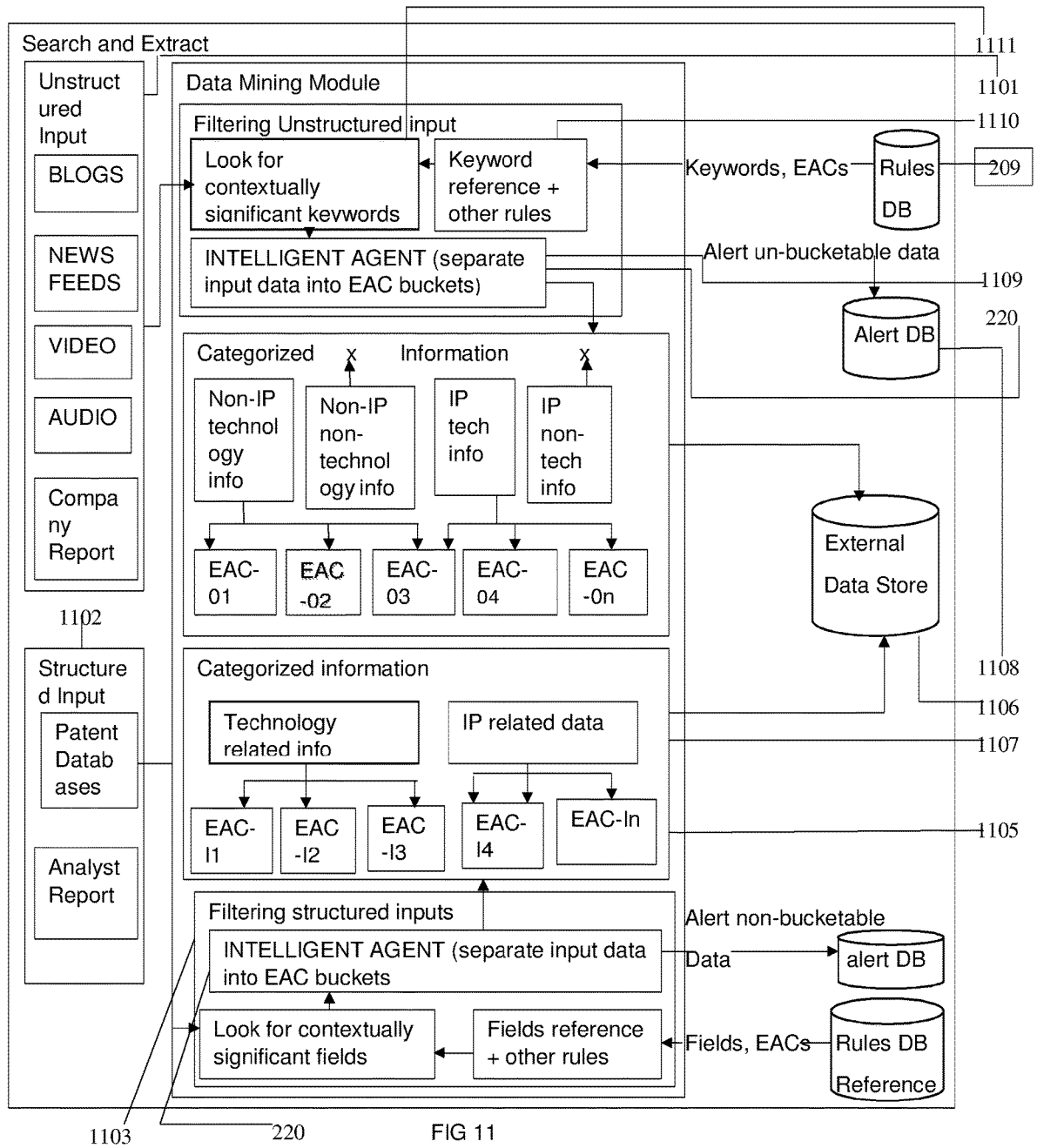
FIG. 11 depicts the search and extraction process carried out by the data mining module according to an embodiment of the present disclosure.
Figure 12A:
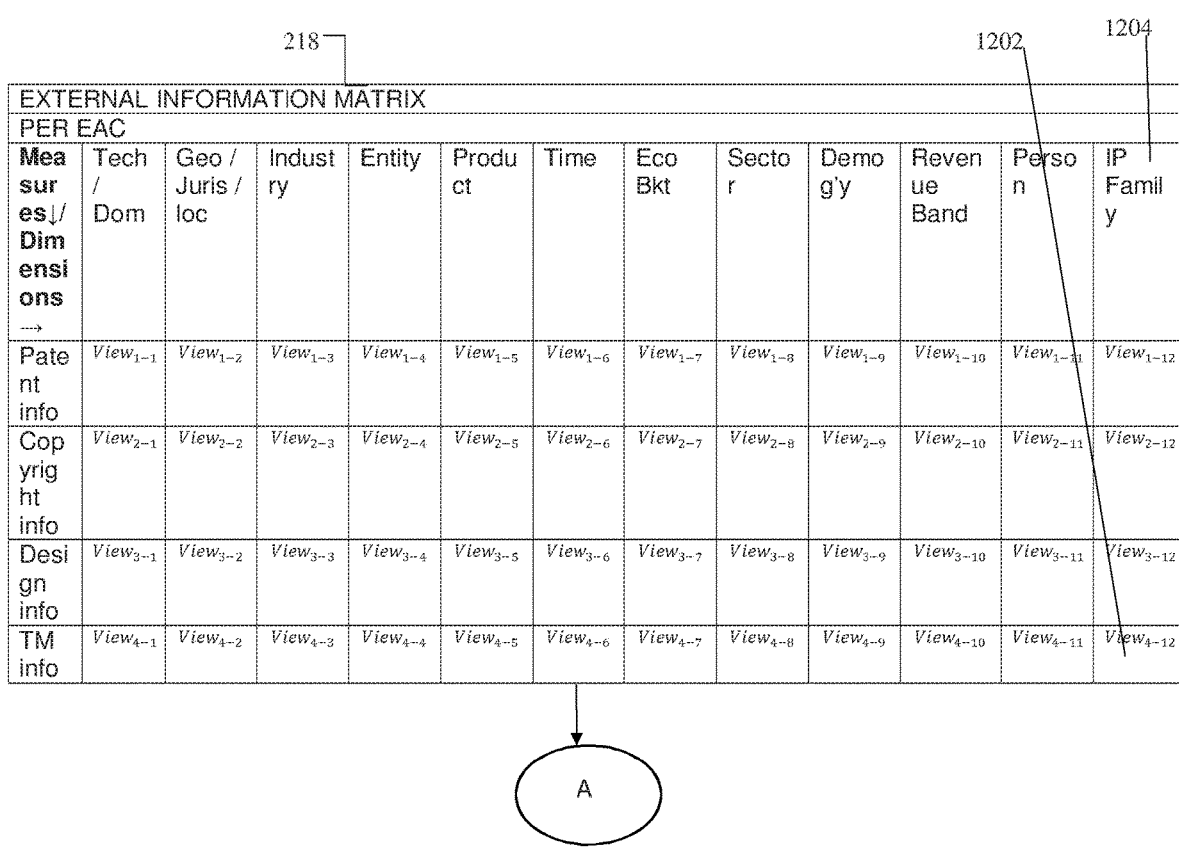
FIG. 12A depicts an external information matrix according to an embodiment of the present disclosure.
Figure 12B:
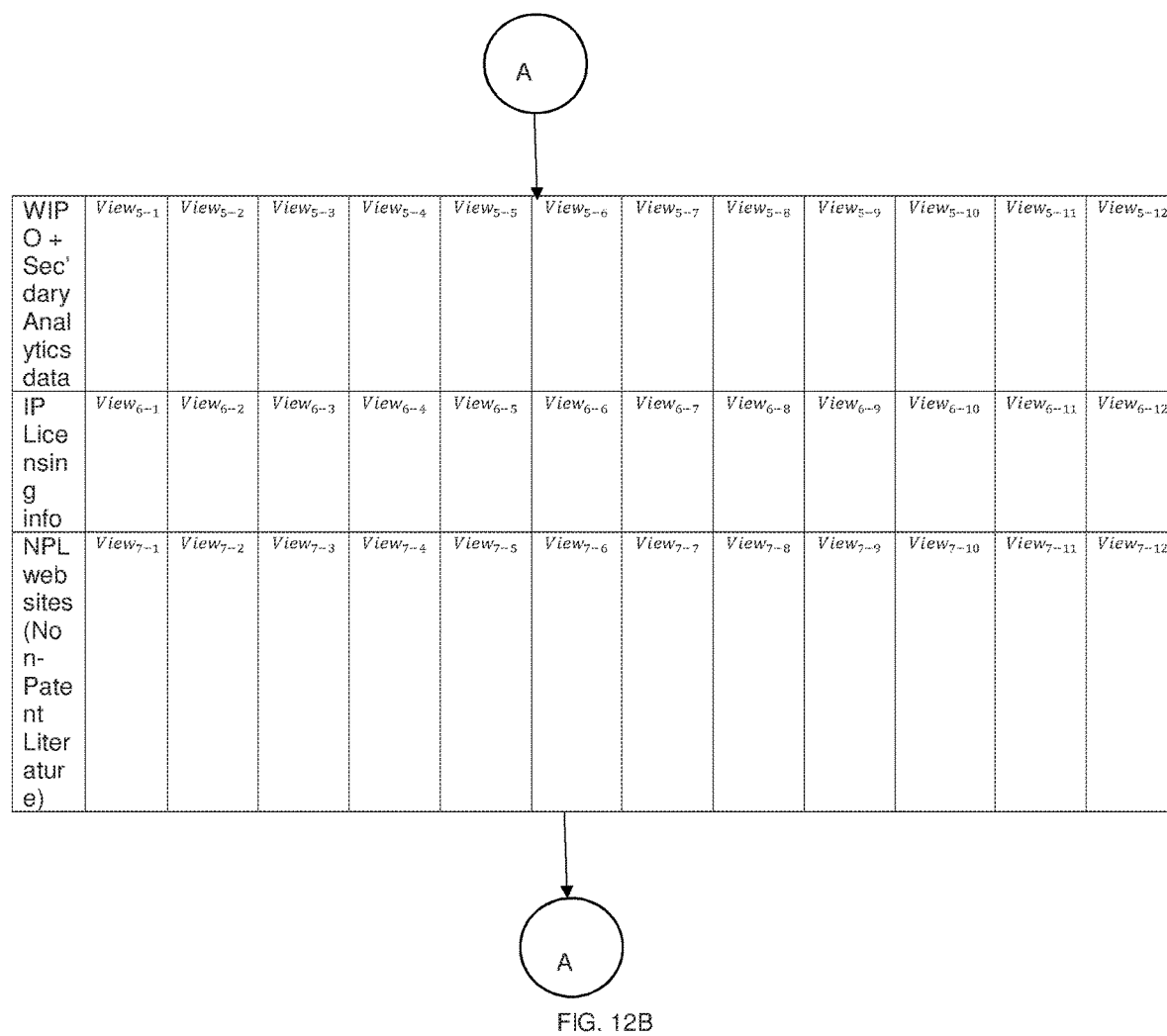
FIG. 12B is a continuation of FIG. 12A depicting an external information matrix according to an embodiment of the present disclosure.
Figure 12C:
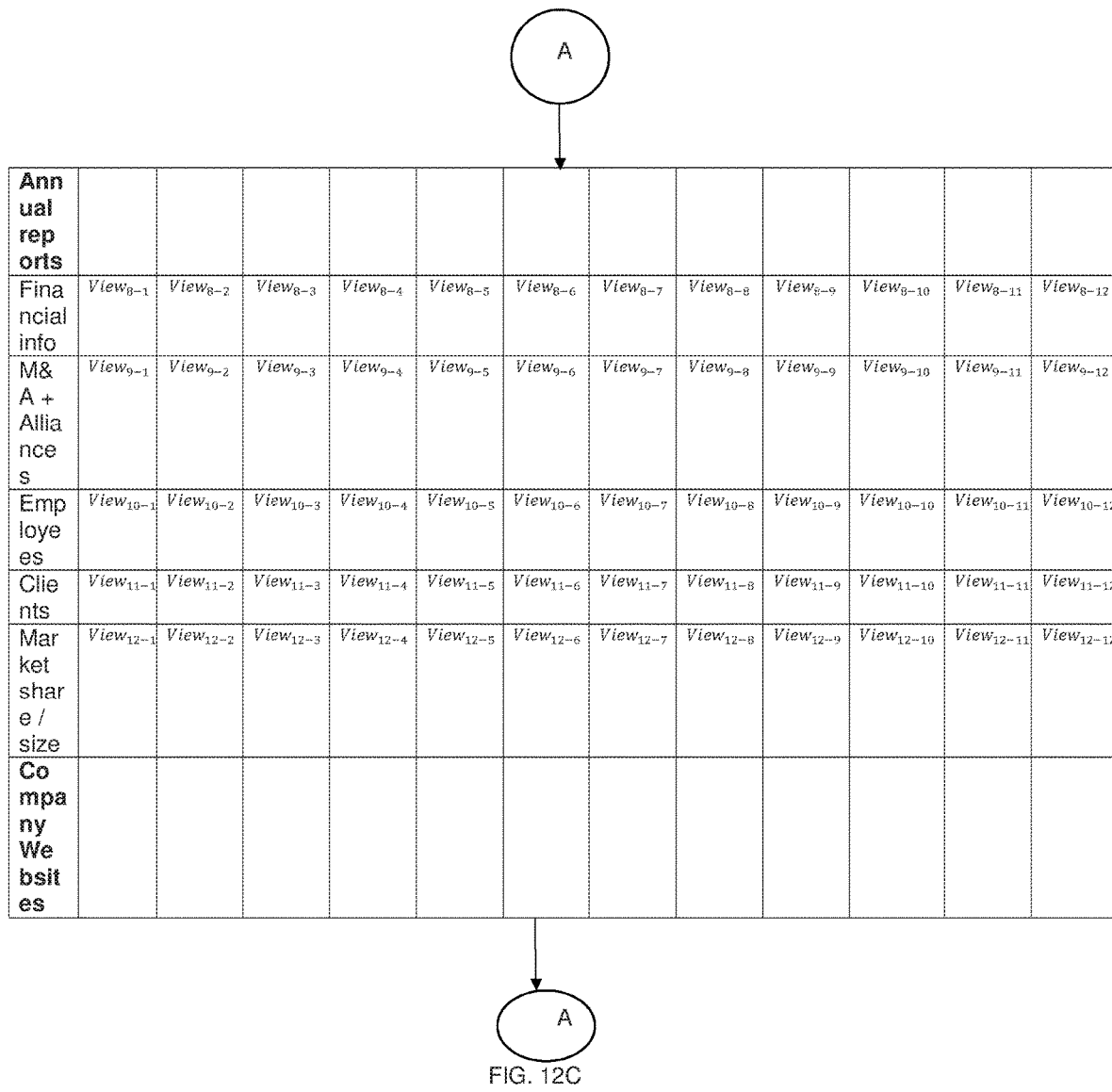
FIG. 12C is a continuation of FIG. 12B depicting an external Information matrix according to an embodiment of the present disclosure.
Figure 12D:
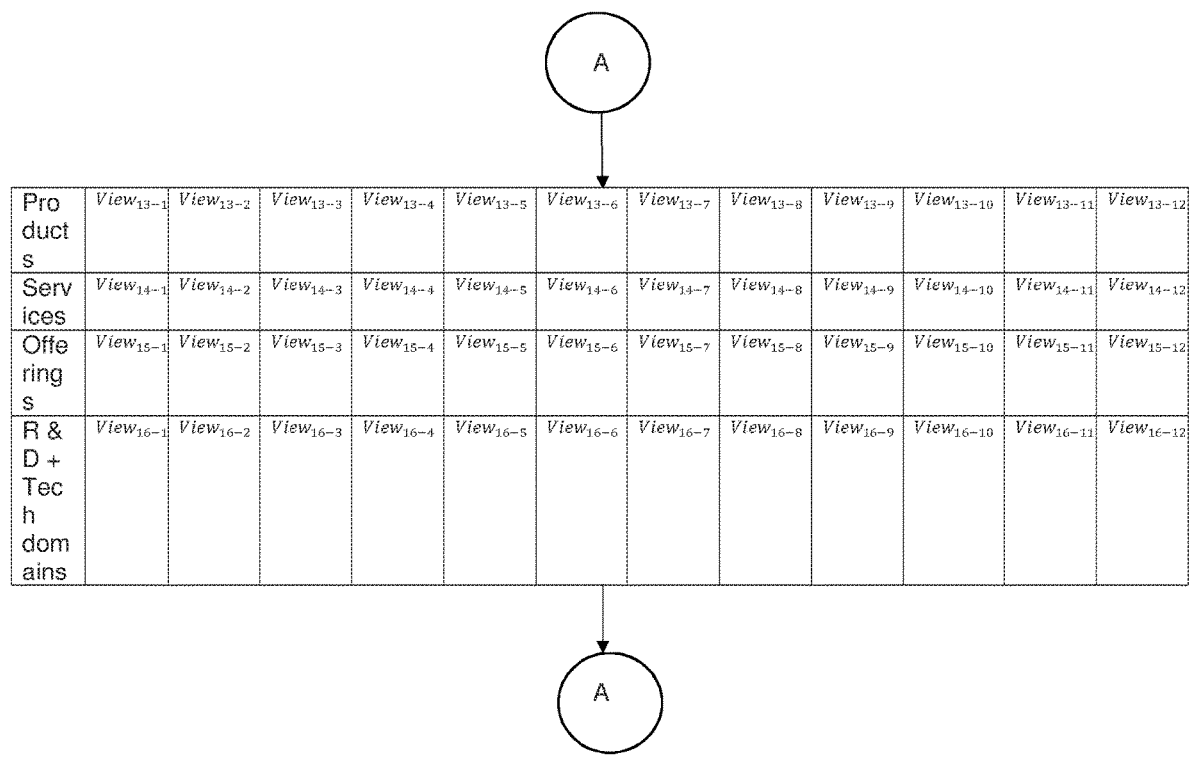
FIG. 12D is a continuation of FIG. 12C depicting an external information matrix according to an embodiment of the present disclosure.
Figure 12E:
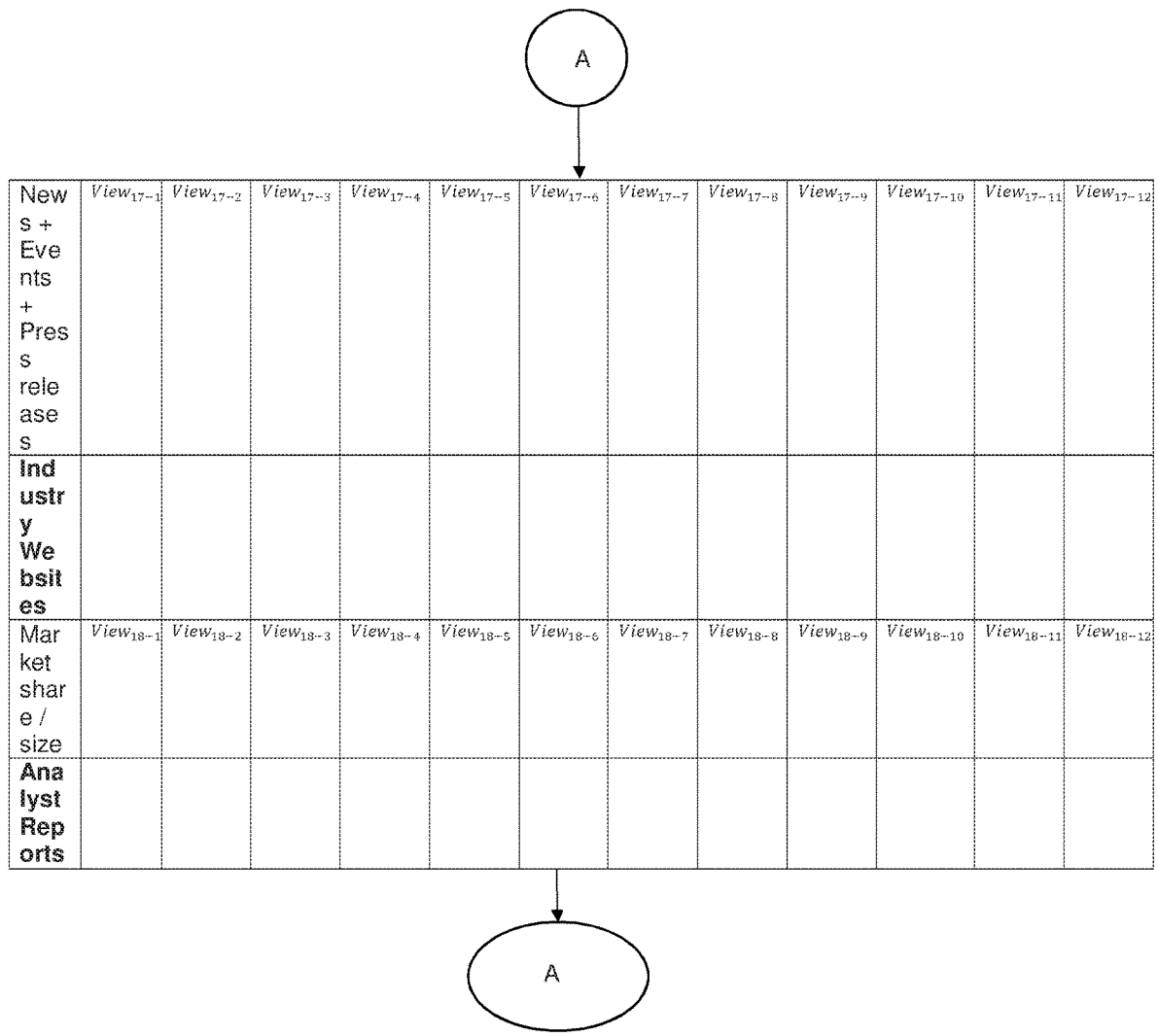
FIG. 12E is a continuation of FIG. 12D depicting an external Information matrix according to an embodiment of the present disclosure.
Figure 12F:
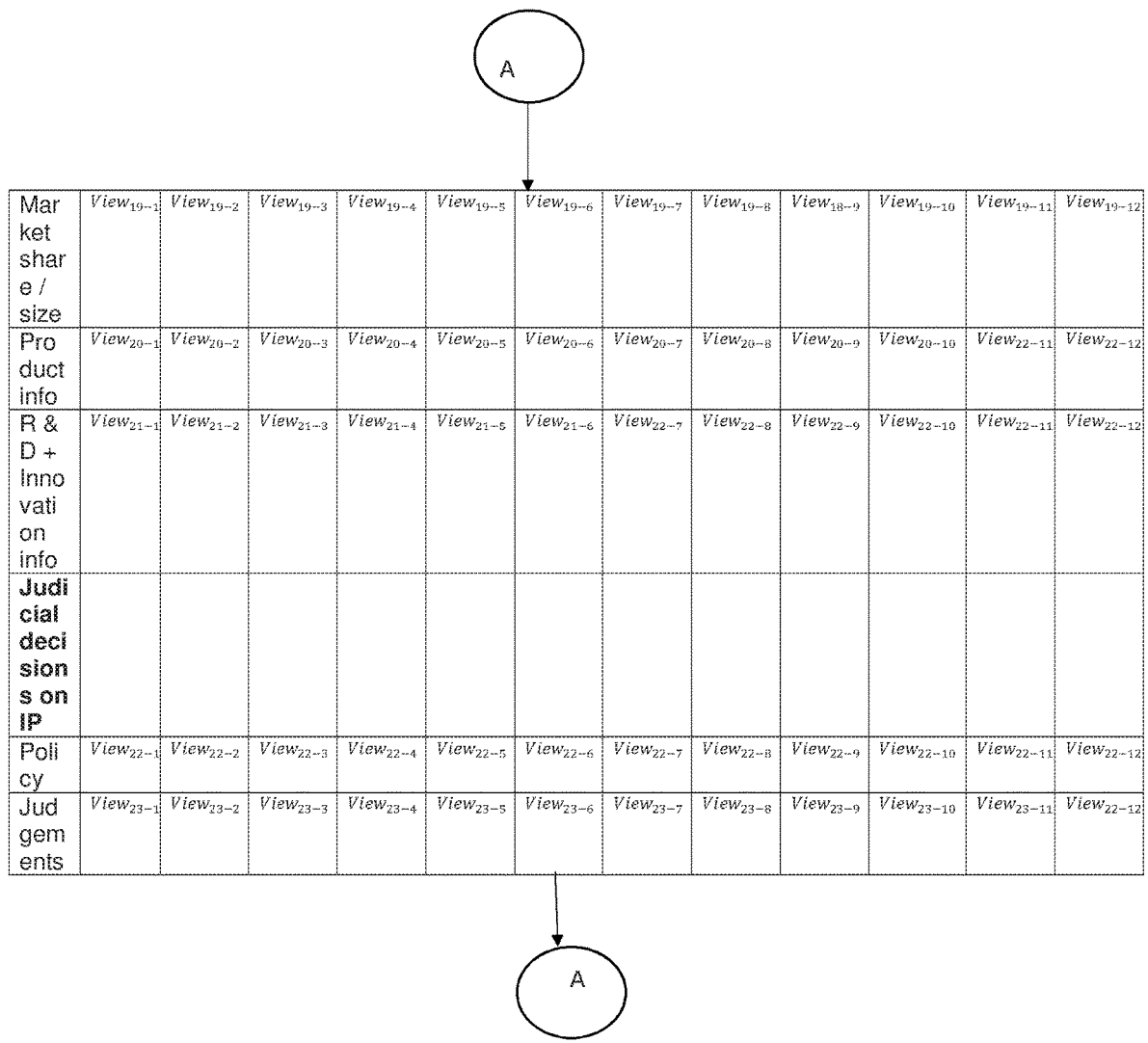
FIG. 12F is a continuation of FIG. 12E depicting an external information matrix according to an embodiment of the present disclosure.
Figure 13A:
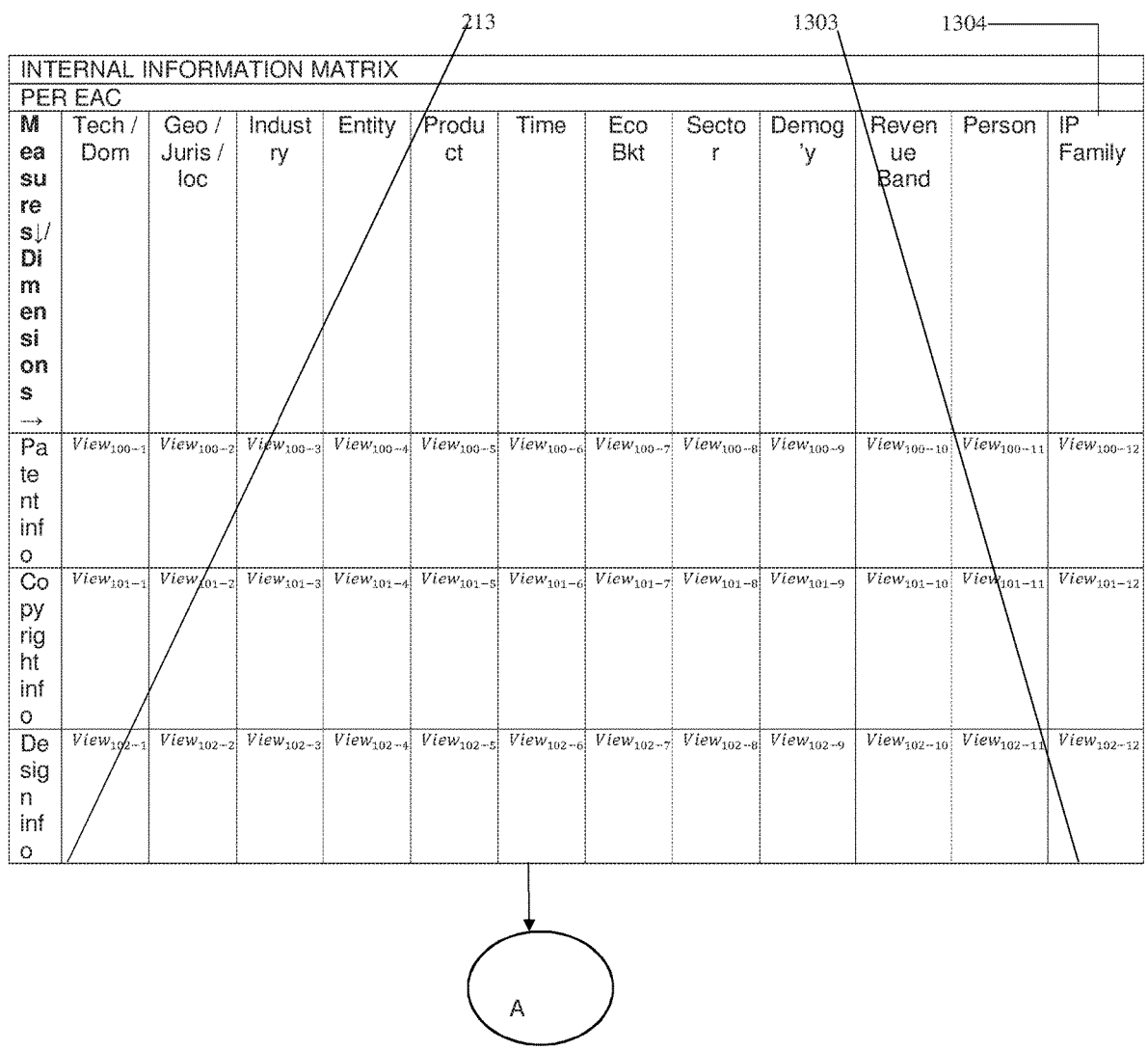
FIG. 13A depicts an internal Information matrix according to an embodiment of the present disclosure.
Figure 13B:
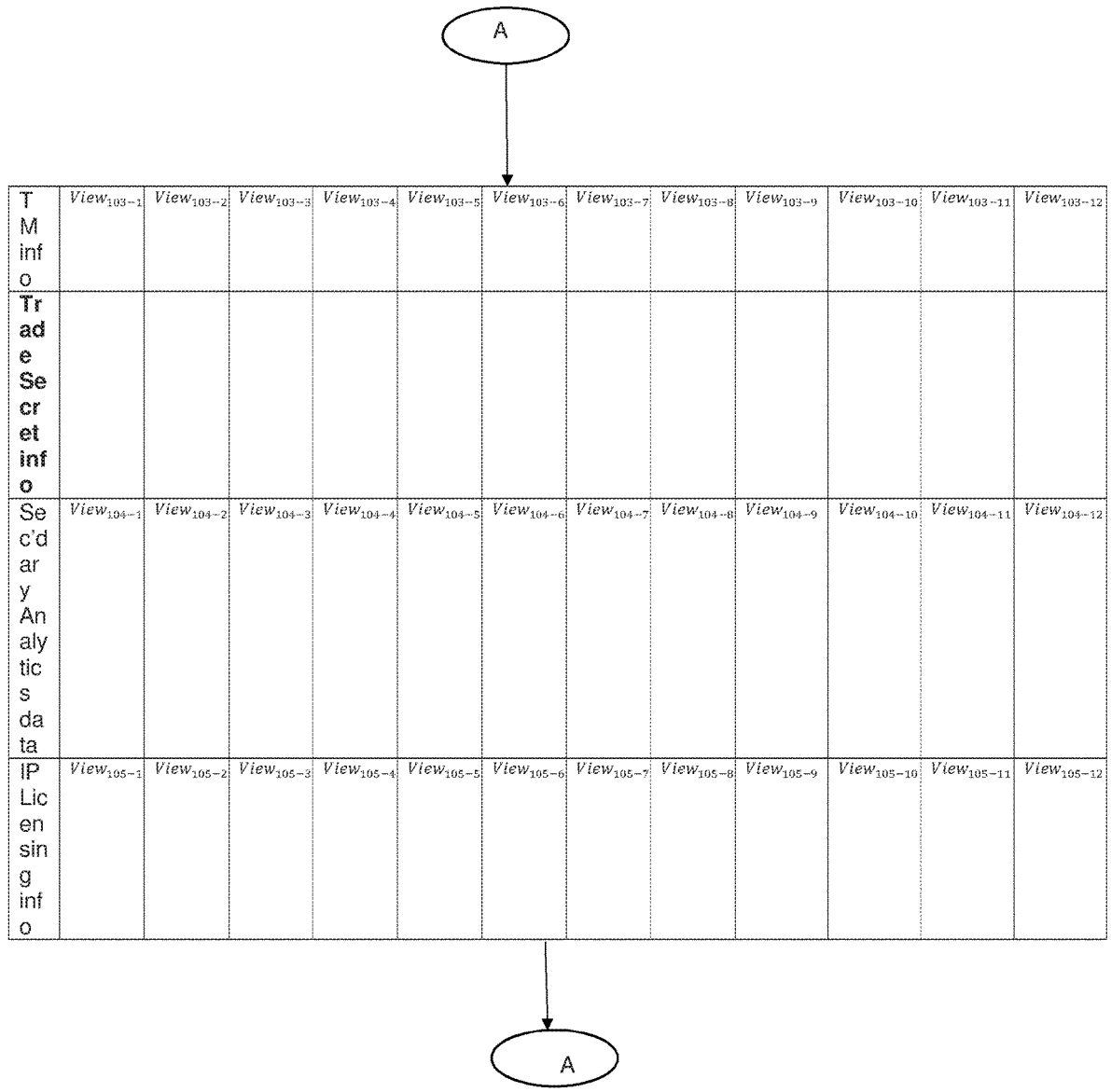
FIG. 13B is a continuation of FIG. 13A depicting an internal information matrix according to an embodiment of the present disclosure.
Figure 13C:
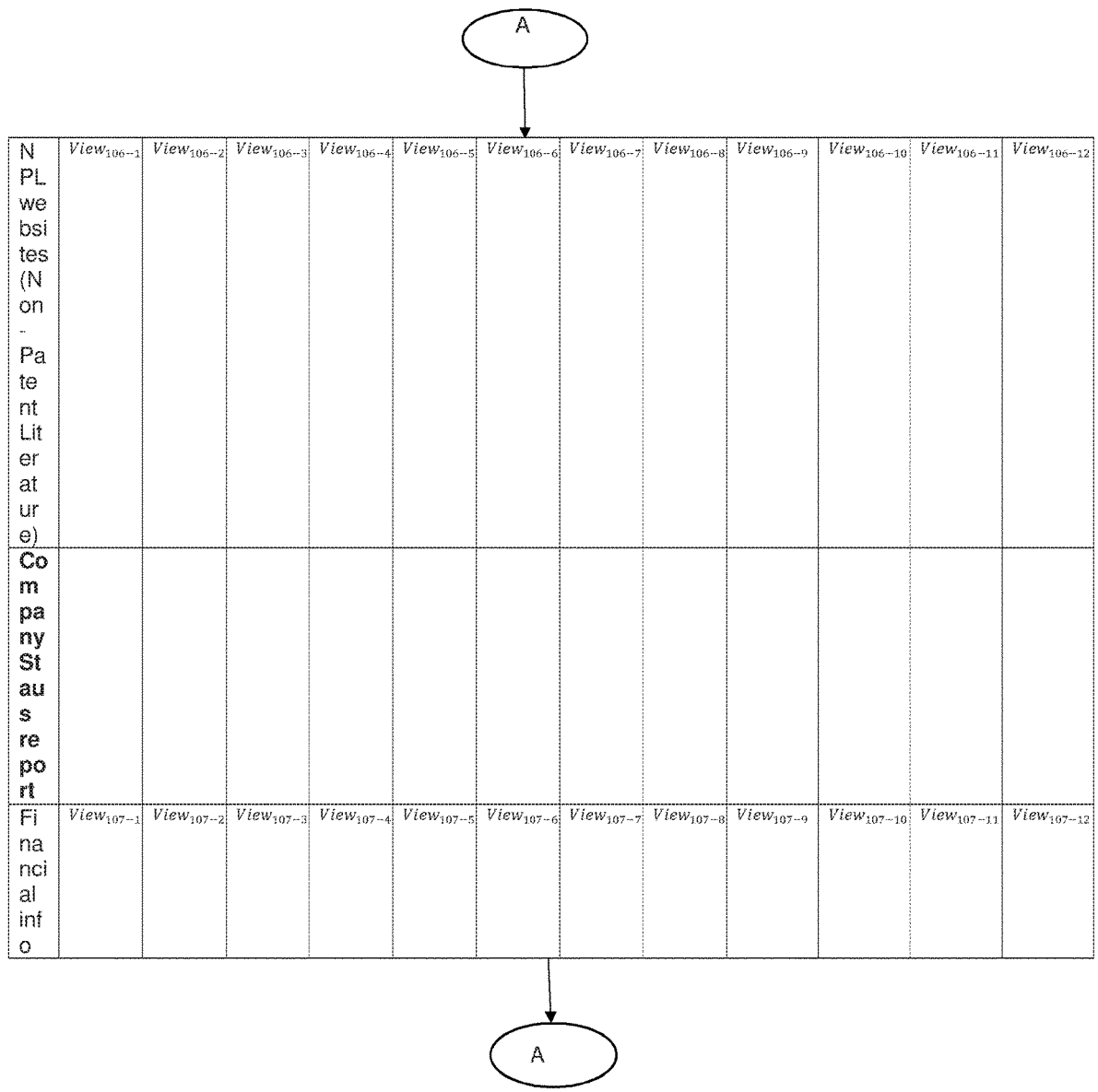
FIG. 13C is a continuation of FIG. 13B depicting an Internal Information matrix according to an embodiment of the present disclosure.
Figure 13D:
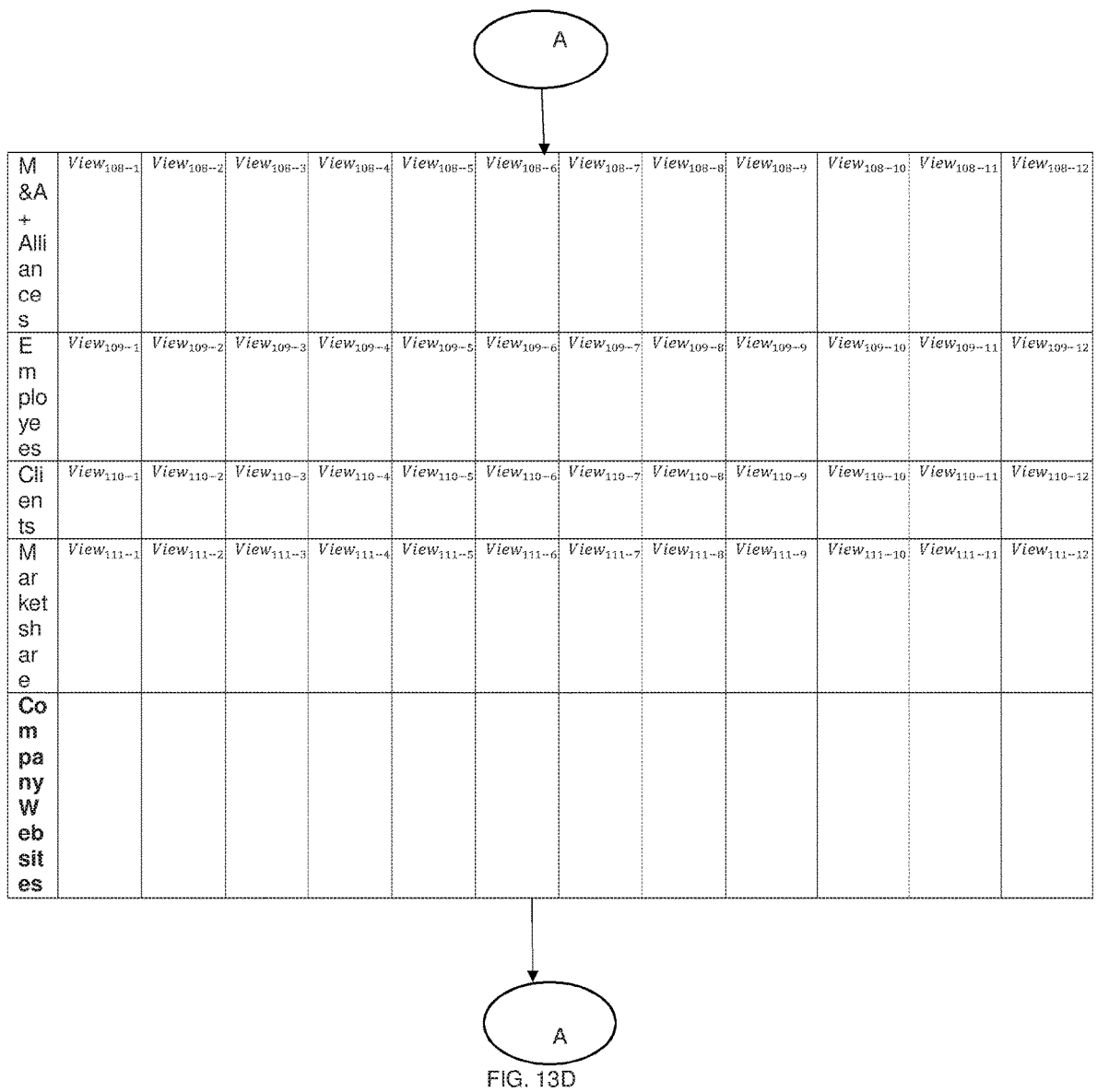
FIG. 13D is a continuation of FIG. 13C depicting an internal information matrix according to an embodiment of the present disclosure.
Figure 13E:
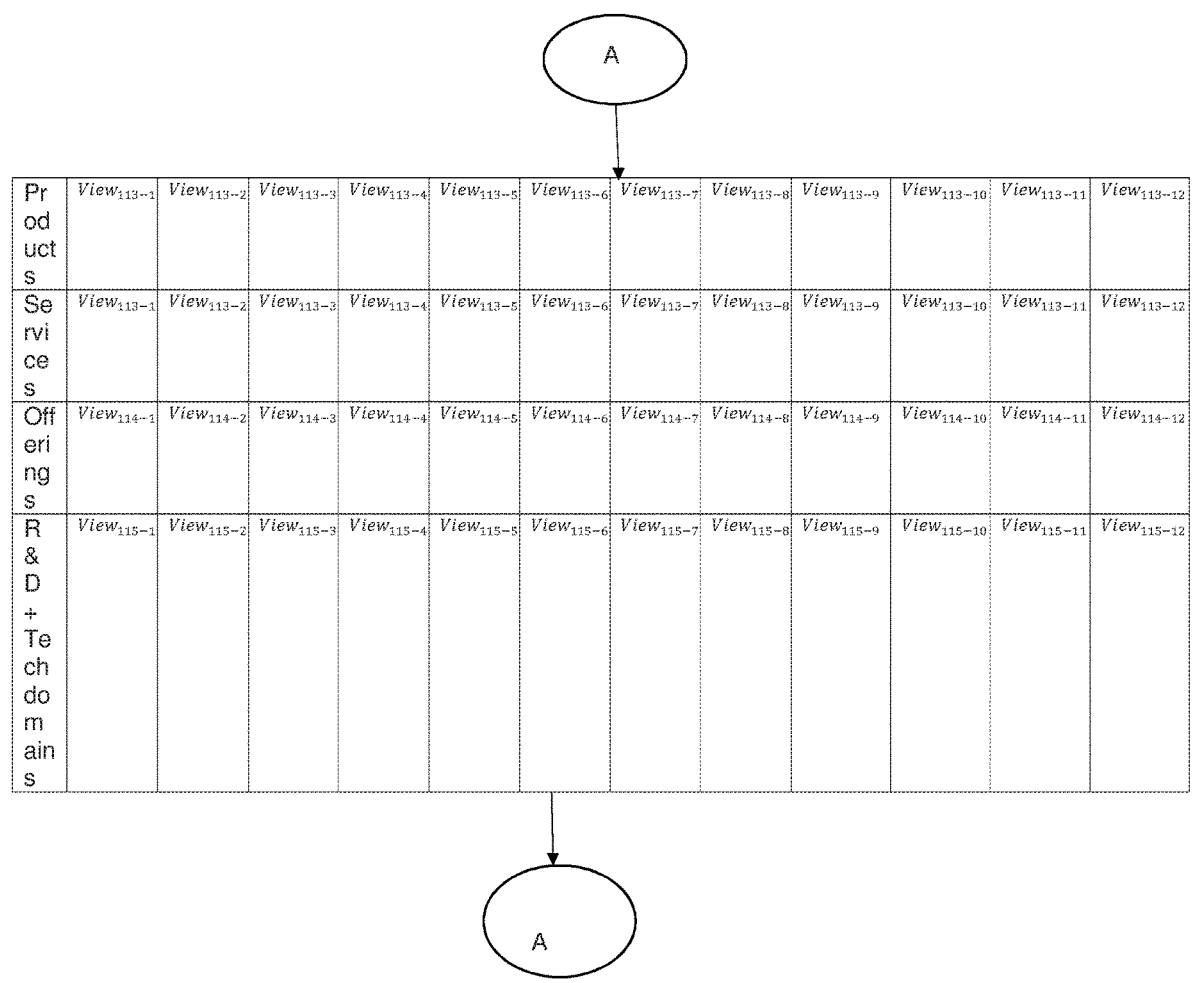
FIG. 13E is a continuation of FIG. 13D depicting an internal information matrix according to an embodiment of the present disclosure.
Figure 13F:
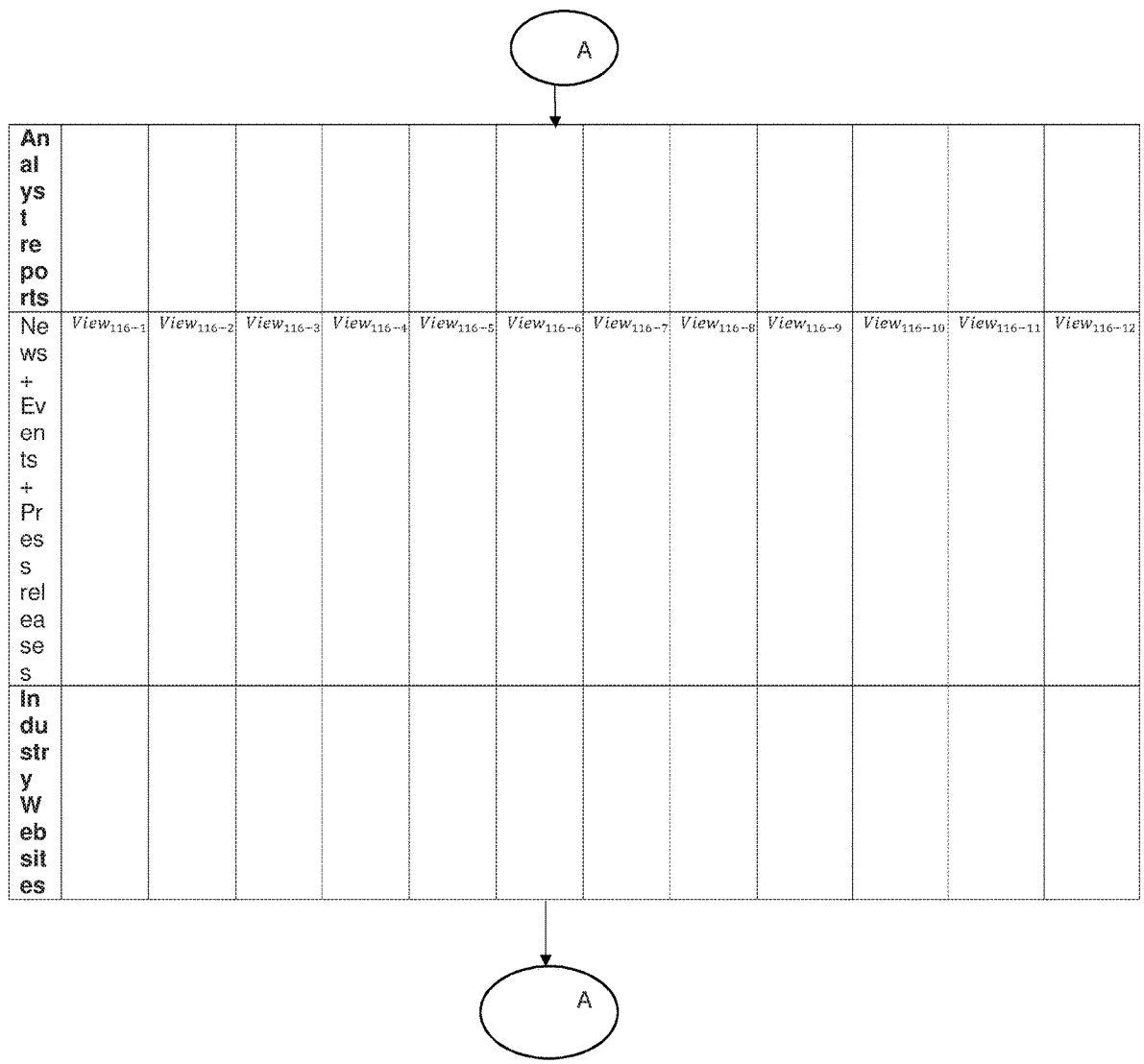
FIG. 13F is a continuation of FIG. 13E depicting an internal information matrix according to an embodiment of the present disclosure.
Figure 13G:
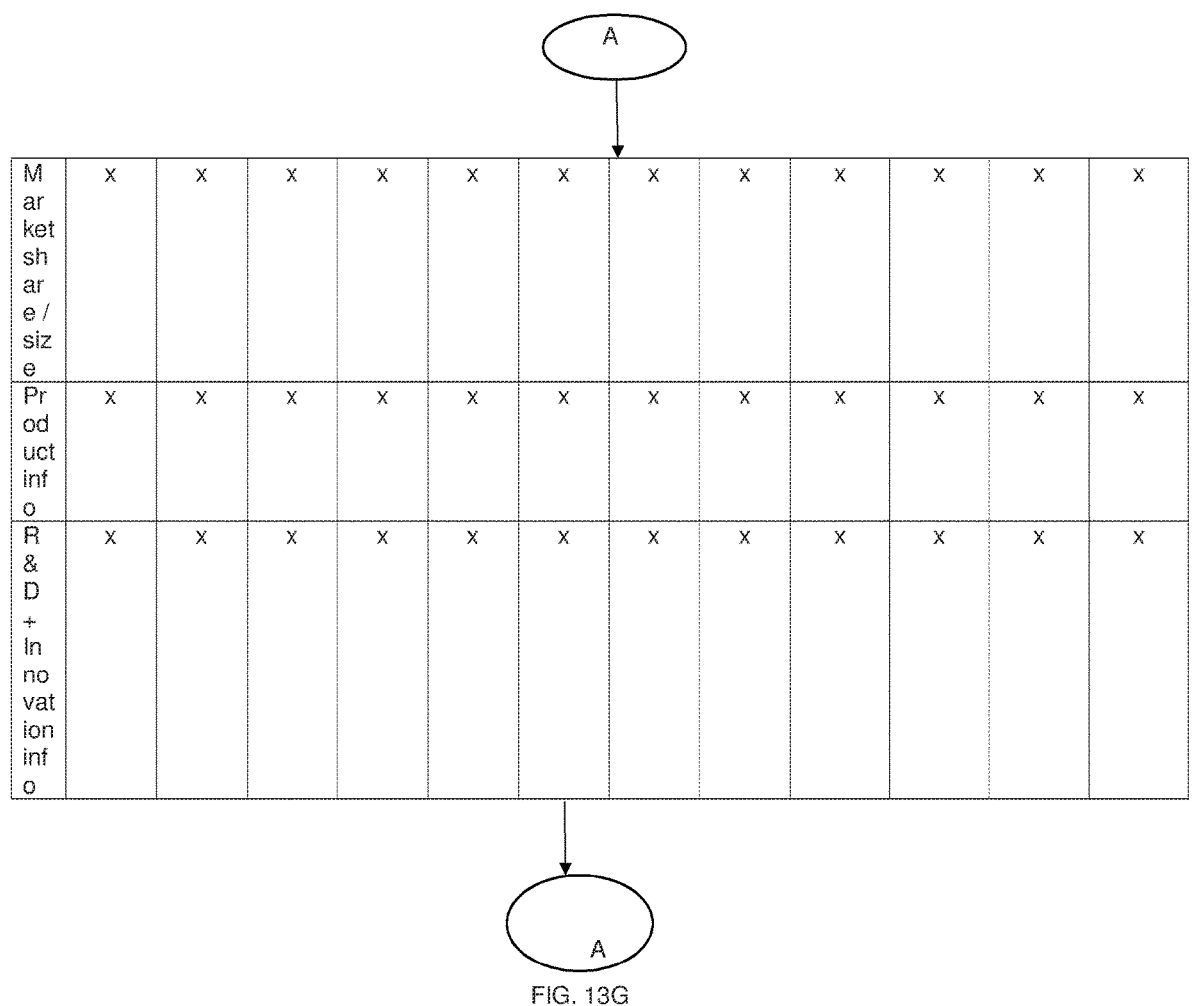
FIG. 13G is a continuation of FIG. 13F depicting an internal information matrix according to an embodiment of the present disclosure.
Figure 13H:
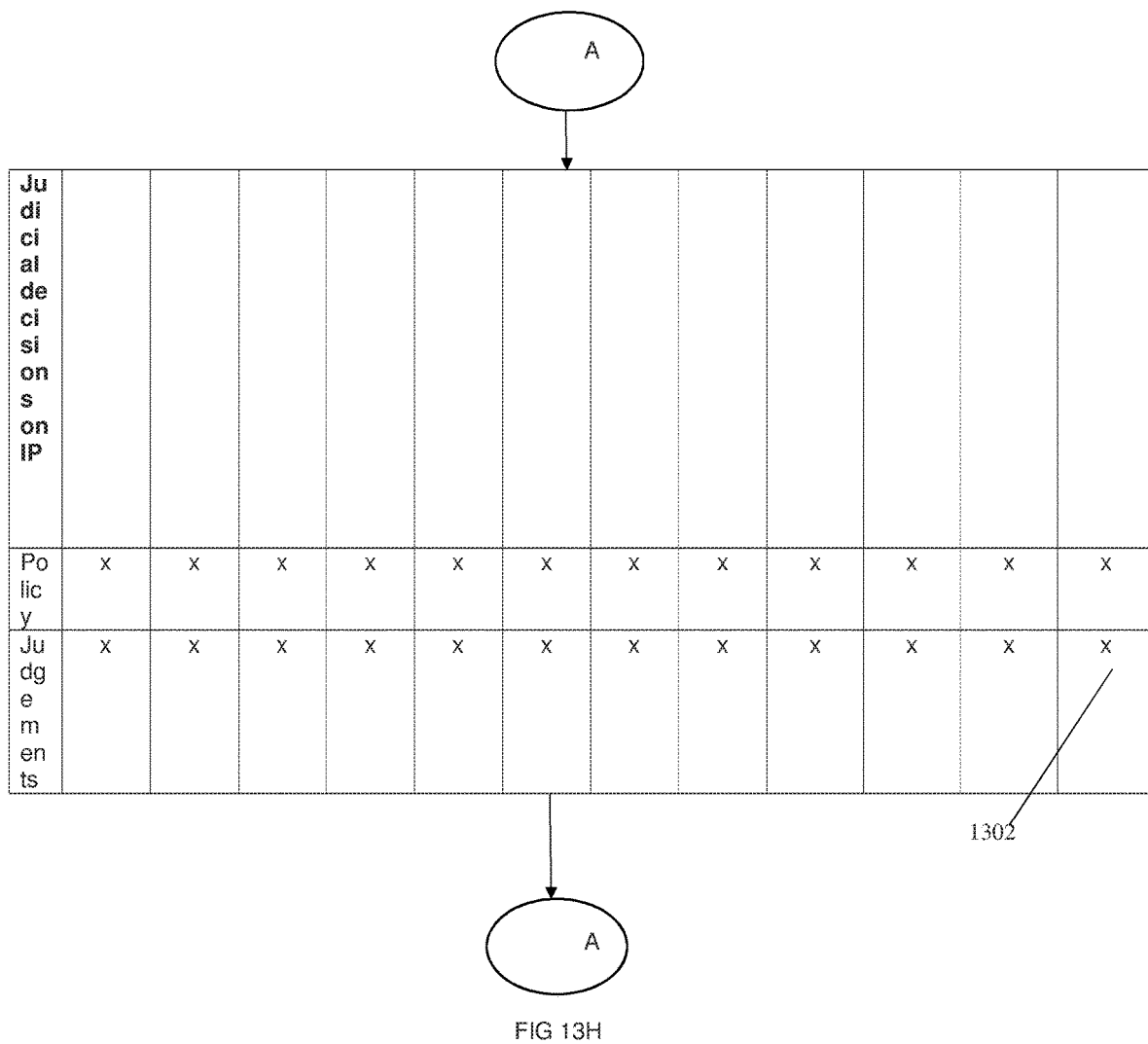
FIG. 13H is a continuation of FIG. 13G depicting an internal information matrix according to an embodiment of the present disclosure.
Figure 14:
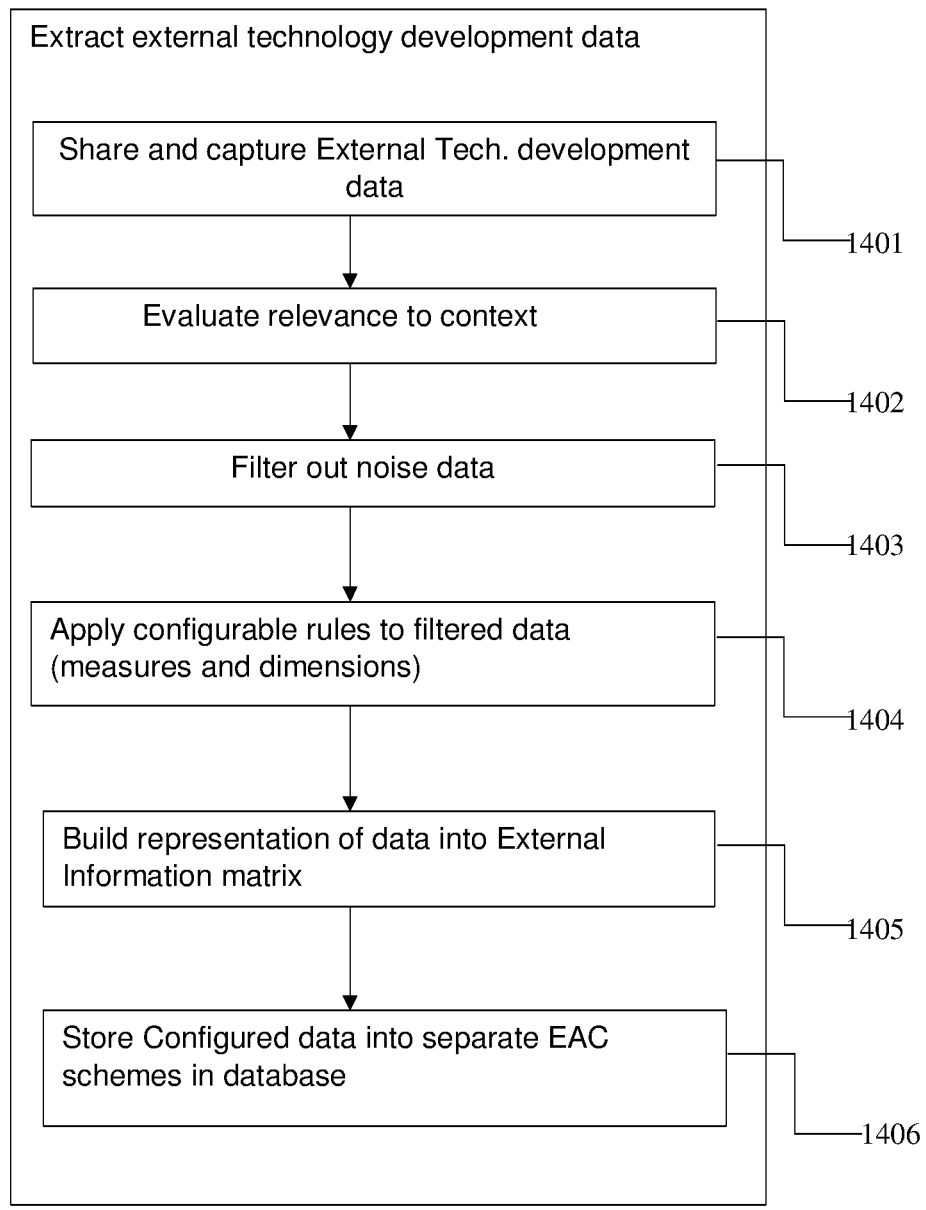
FIG. 14 depicts the process flow for external technology development data extraction according to an embodiment of the present disclosure.

FIG. 11 depicts the search and extracts process carried out by the data mining module according to an embodiment of the present disclosure. FIG. 14 depicts the process flow for external technology development data extraction. According to FIG. 11 the external technology development data and internal intellectual portfolio data searched by the data mining module 216 can be structured input 1101 and unstructured input 1102 in nature. The search is conducted at one or more pre-defined interval or period 303 on external technology development data 304 and internal intellectual property portfolio data 302 as depicted in FIG. 3. The periodicity of the search is defined by the system admin and stored in the rule database 209 also referred as Rule Data Base (DB) 209 hereinafter.

In one example embodiment, the search is based on one or more rules, one or more keywords, and contexts stored in the rule database 209. Rules can include guidelines for example, which websites (or web pages) to obtain information from. The one or more rules are predefined or generated in real-time such that the system 100 is able to identify and retrieve only relevant content (or information) from the web pages. Keywords for example, may include, but are not limited to, "robotics", "valuation", etc., or short phrases for example, but are not limited to, "big data", "artificial Intelligence", "Internet of things", etc. Contexts for example, may include, but are not limited to, "internet based real time conversation system", "financial report of companies", etc. The one or more rules are updated in the rule database 209 with guidelines based on the search conducted which further enables to fetch, aggregate and analyze relevant data thereby obtaining results that are relevant and effective. The embodiments of the present disclosure provide below illustrative steps Involved in the search process by way of example:

1. Scan sites by employing the services of a web crawling mechanism. Alternately RSS feeds can be tapped and relevant information can be accessed. The Rule database 209 includes an initial level of search restriction by implementing either a whitelist of sites to visit or a blacklist of sites to ignore. This is level 1 of Noise Filtration.
2. The Rule database 209 further includes a list of broad level keywords to look for, which can be configured by the user through, usually infrequent, updates. Keywords like Telecom, Retail, etc. may come up in this list that helps to achieve a broad level of filtration. This is level 2 of Noise Filtration.
3. Filter inputs by context matching. The context is stored in the Rule Database 209 in the form of statements.
   a) Context scoring principles and reference values are stored in the Rule Database 209.
   b) Context evaluation of input data is carried out and a set of scores are obtained. This is matched with a similar form of context scores stored in the Rule DB 209.
   c) Low match scores are rejected and high match scores are accepted.

Context matching is achieved by matching a context stored in the Rule DB 209 as a statement with which input information, in the form of text will be matched. A scoring process determines the strength of the matches at different levels of the process. The details of the matching are as follows:
   I. Word matching: Each matched word increases the score of the word-match counter. Since, the frequency of occurrence is also a significant factor; this aspect is also captured in the scoring process.
   II. Combination and sequence matching, also known as phrase matching: Each significant combination of words as they appear in the Rule Database 209 is detected and any occurrence is acknowledged by incrementing the score of a phrase-match counter.
   III. If the score combinations of the input data as percentages of the input data is greater than a predefined threshold, then the input data is relevant in a given context.

Figure 15:
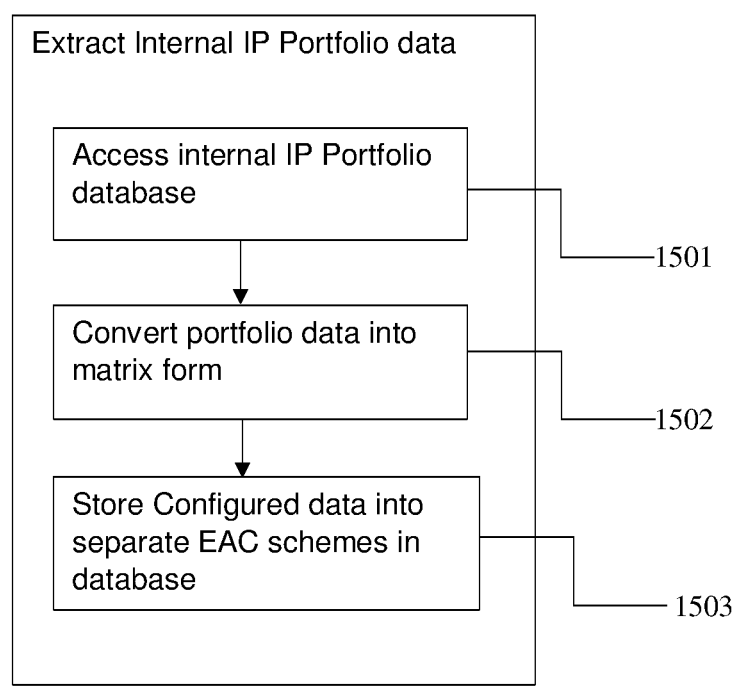
FIG. 15 depicts the process flow for internal intellectual property portfolio data extraction according to an embodiment of the present disclosure.
Figure 16:
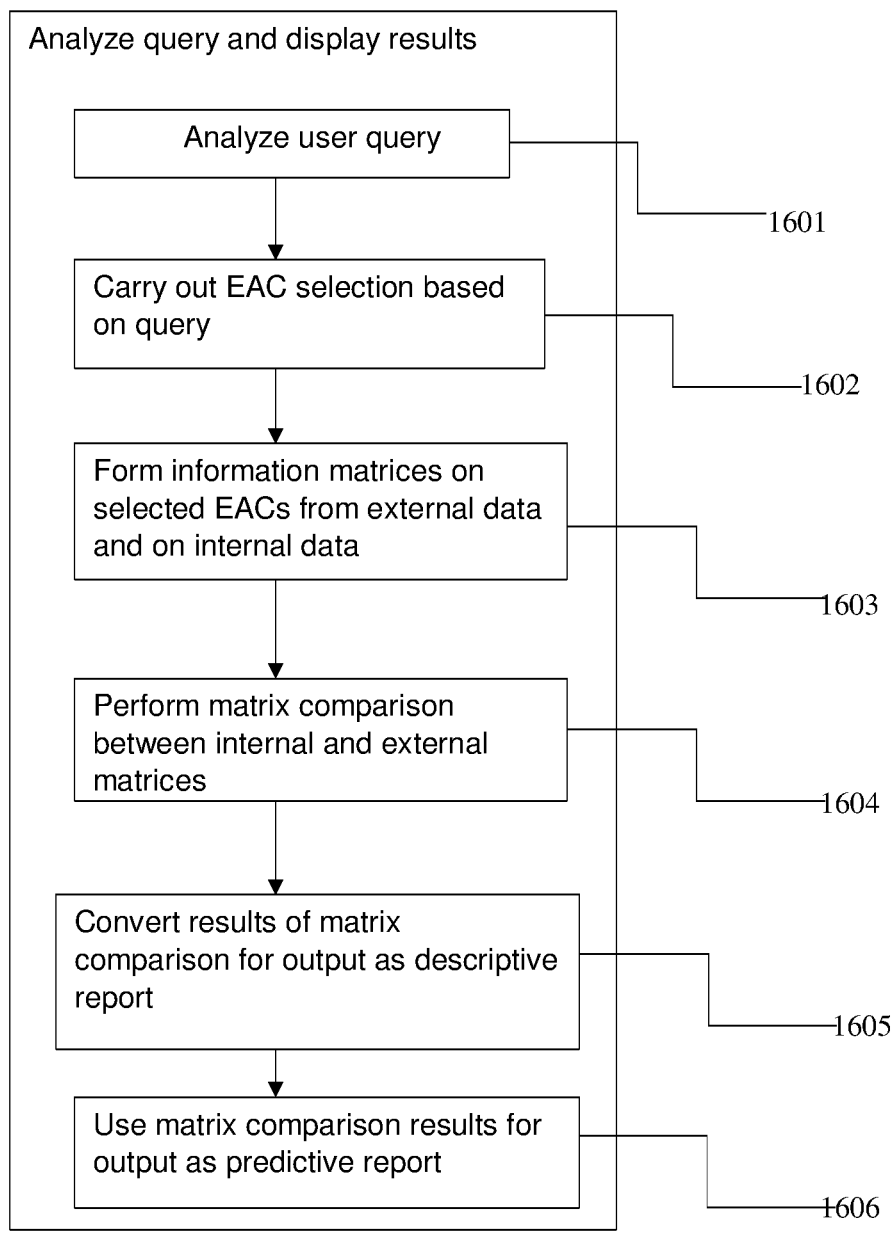
FIG. 16 depicts the analysis of data and display of data in descriptive and predictive dashboards according to an embodiment of the present disclosure.

The data mining module 216 mines relevant data from the entity's own IP data base. FIG. 15 depicts the steps involved in this data mining process of data mining module. The mining operation is modulated by the same rule engine 207 running on the entity rule database 209. Hence the system 100 essentially mines data both from external source and internal intellectual property portfolio data based on same set of entity rules and same rule engine 207. This ensures that data captured from both of the sources are harmonized and coherent.

An Intelligent agent 220 then takes these mined data both from external technology development data and internal intellectual property portfolio data and puts them in specific data containers in the external information data base 1106 called Entity Aligned Clusters (EAC). Each EAC can be considered to be a schema and each data entry can correspond to a table. Each table may comprise one or more sets for measures for which there may be respective attributes as depicted in FIG. 12A to FIG. 12F and FIG. 13A to FIG. 13H. Any incoming data would be broken down (or segregated) into respective measures 218, 213 and attributes 1204, 1304 through a score for each attribute. Thus each schema would correspond to an EAC (one to one mapping) and may have multiple tables to capture data pertaining to that particular EAC. The bucketing into EACs is performed by the intelligent agent (220), which analyzes the input data and based on the keywords associated with the EACs as configured in the Rule Database, decides which EAC container the data will be categorized into.

There could also potentially be instances where through Its internal scoring mechanism (i.e. similarity between keywords of EAC and input data) of determining strength of association of input data with EACs, no clear choices can be made regarding which EAC an input data will fall into. In that case the intelligent agent 220 generates an alert for the user to make business decisions about the categorization of such kinds of input data. Such alerts are stored in an alert database 1108 which may be accessible to the user for necessary action(s). Once action is taken the alerts ceases to be active.

Figure 4:
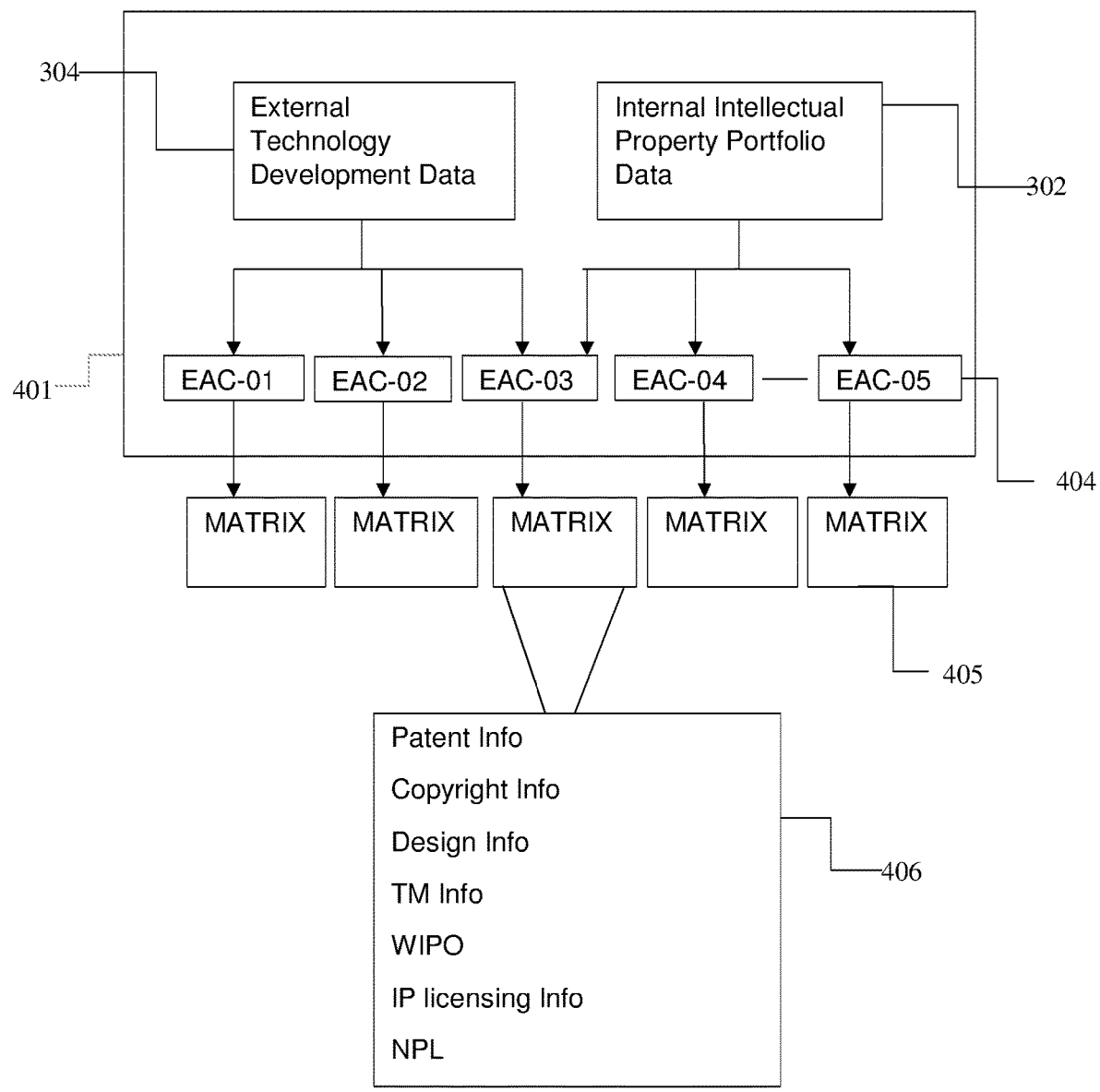
FIG. 4 depicts entity aligned cluster (EAC) formation according to an embodiment of the present disclosure.

FIG. 4 depicts entity aligned cluster (EAC) formation according to an embodiment of the present disclosure. Both external technology development data (304) and internal intellectual property portfolio data (302) are stored in EACs 404. Both of this data 304 and 302 is stored in a matrix form 405 in each EAC.

The entity mentioned here can be any one of a Nation, Large Corporate, MSME (Micro, Small or Medium Enterprise), Research Institute and Non-Practicing Entity/Patent Asserting Entity. In one embodiment the entity can be a mobile phone original equipment manufacturer. The typical EACs for such an entity can be the research departments in the organization i.e. Screen technology (LED, LCD, OLED etc.), touch technologies (capacitive, inductive), battery, keyboard, charging, connectivity etc. Similarly for a software company EACs may be defined as IOT, Big data, Mobility, Software Engineering, Testing etc. The EACs can also be aligned to business line like Banking, Retail, Utility, etc. The EACs are customizable according to an entity requirement and can be hybridized by including both technology and business. Hence a person skilled in the art would understand that the EACs can widely vary according to the type of an entity and its requirements.

Figure 5:
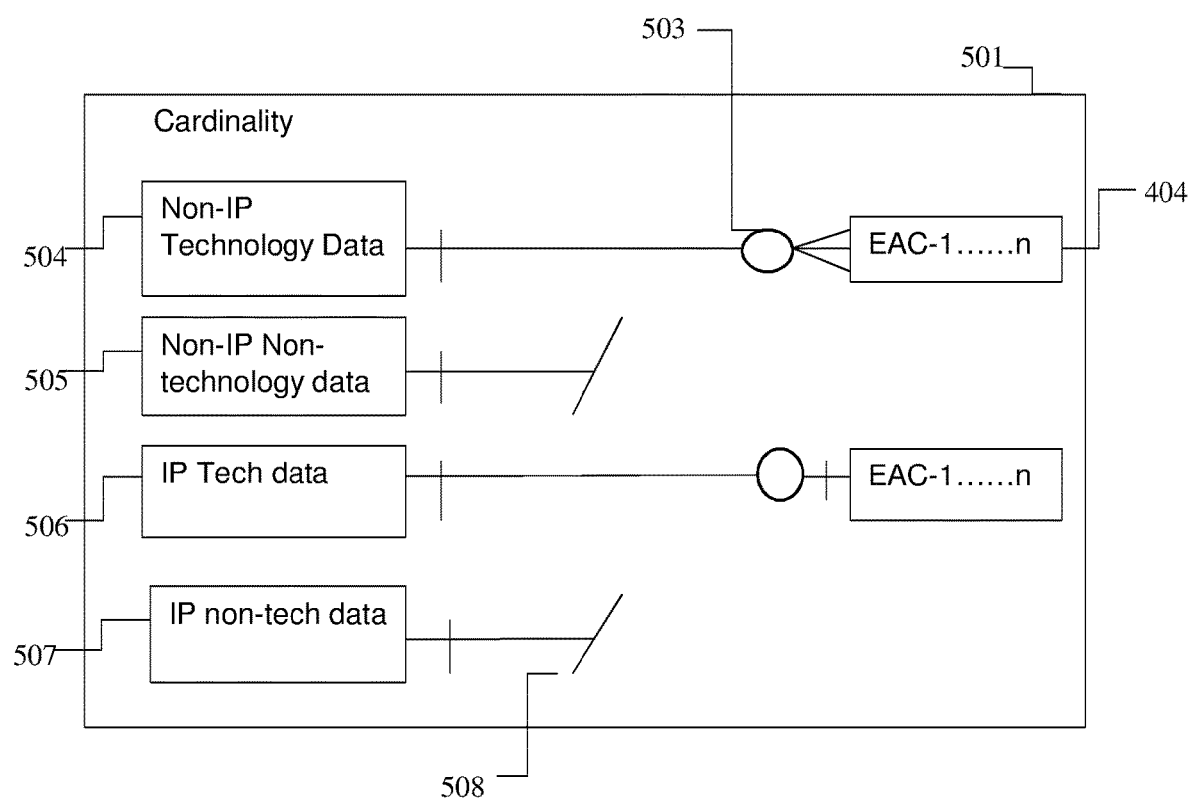
FIG. 5 depicts the cardinality of data flow into EACs according to an embodiment of the present disclosure.

For a user as an entity (i.e. nation, corporate, small and medium enterprises and research institutes), first a list of areas of interest needs to be identified based on this list and by sub grouping and merging (or combining) these areas of interest, a final list of EAC can be formulated. Each EAC should have a proper descriptor, for example, 30-40 words write-up and list of key words (e.g. for Big data EAC, the key words can be Hadoop, Map reduce, NoSQL etc.). The list of EACs along with their keywords would be populated in the Rule database 209 of the system 100. The data mined 202,203,204 and 205 is automatically populated in respective EAC schema based on the key words present in it. The cardinality 501 of data storage in EAC 404 format is depicted in FIG. 5. Non-IP technology data 504 and IP technology data 506 is stored in at least 1 EAC 404 and hence Is a one to many mapped storage. Non-IP non-technology data 505 and non-technology IP data 507 is not stored by the system. The clustering of data into EACs would enable the system 100 to compare them with minimum or no human intervention and thus would provide predictable results repetitively.

As illustrated in FIG. 12A to FIG. 12F: External Information Matrix 218 and FIG. 13A to FIG. 13H: Internal Information Matrix 213 (unpublished information) the data is organized into a matrix form in which the individual cells of the matrices are views as determined by the parameters (row headers) and dimensions (column headers).

The external information matrix 218 houses published data obtained from external sources including that of the user entity. The updates to the external information matrix 218 are periodic and the periodicity of updates for each of the line items/parameters/measures may be different (or vary) depending upon its nature, and is configurable and stored in the Rule Database 209.

The internal information matrix 213 (FIG. 13A to FIG. 13H: Internal Information Matrix (unpublished information)) comprises data that is unpublished by the user entity but may have the pointers/identifiers (IDs) of the published entities for linkage, as in the case of patents, copyrights, etc. The internal information matrix 213 will not contain any data that is fully and completely public as that will appear in the external information matrix. As depicted in the 2 matrices, the data forms are similar for comparison by the aggregator 219.

Figure 6:
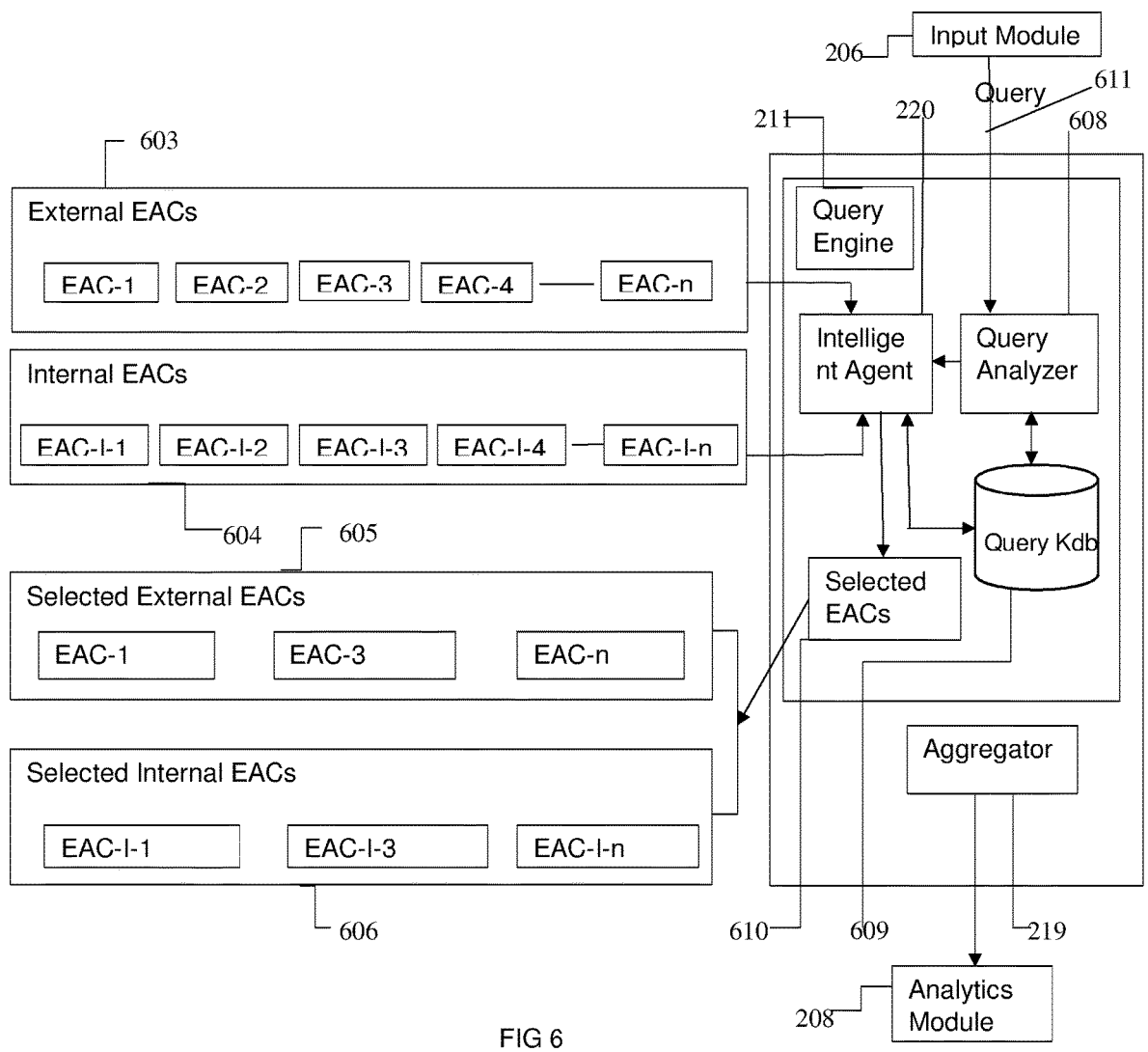
FIG. 6 depicts a system diagram of working of the query engine and aggregator module on the EACs according to an embodiment of the present disclosure.

FIG. 6 depicts a system diagram of the query engine 211 according to an embodiment of the present disclosure. It comprises of an intelligent agent 220, a query analyzer 608 and a Query Knowledge Data Base (KDB) 609. The job of the query engine 211 is manifold; it needs to accept the user query that would in most cases be free running text, make sense of it and convert it to objective parameters like keywords, relationship between keywords, proximity between keywords, sequence, repeats, etc. It is also a self-learning and self-improving module that stores knowledge from the past usages (or history), for which it employs a Query KDB also depicted in 609 and corresponding self-learning engine.

Figure 7:
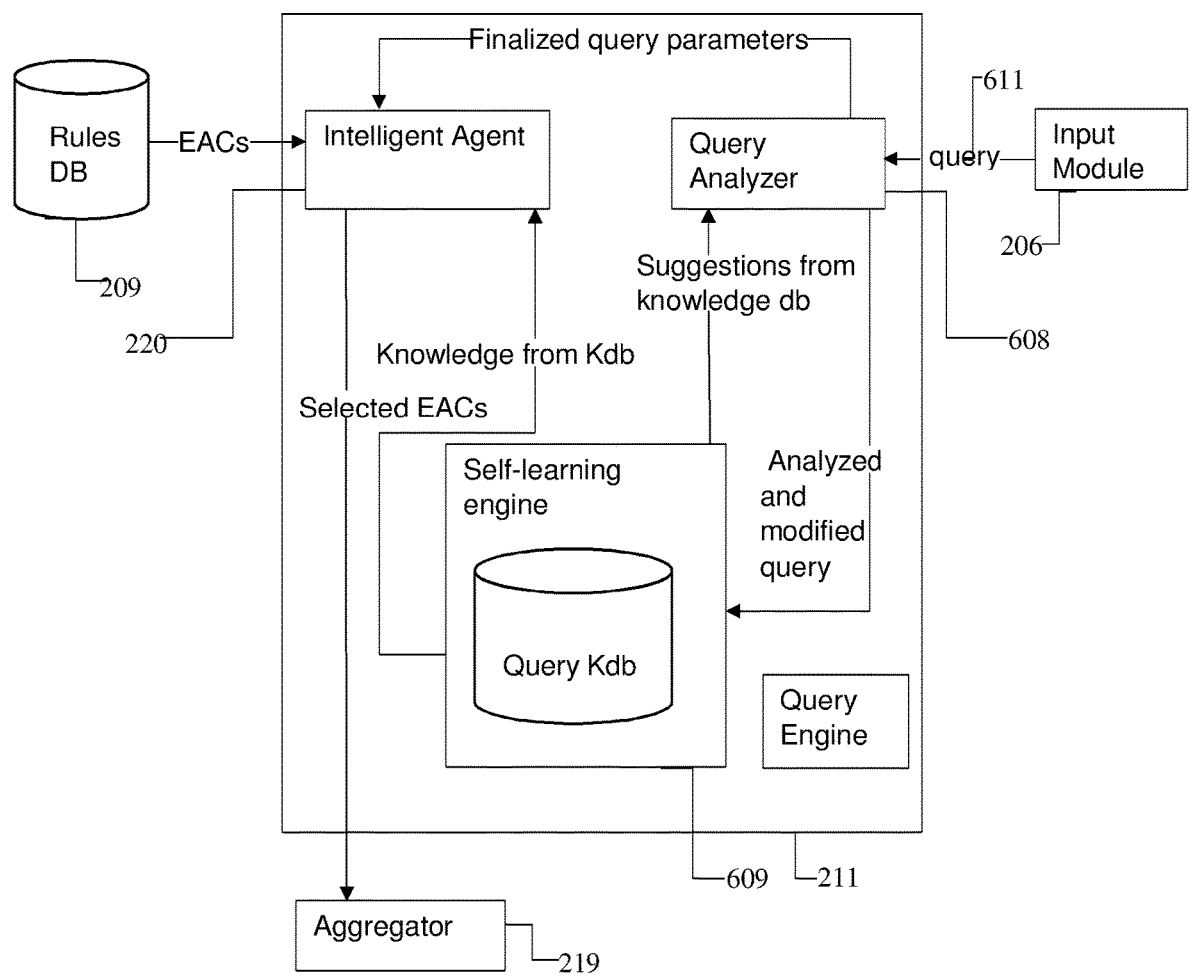
FIG. 7 is a representative modular diagram depicting the self-learning capability of the query engine module and EAC selection mechanism according to an embodiment of the present disclosure.
Figure 9:
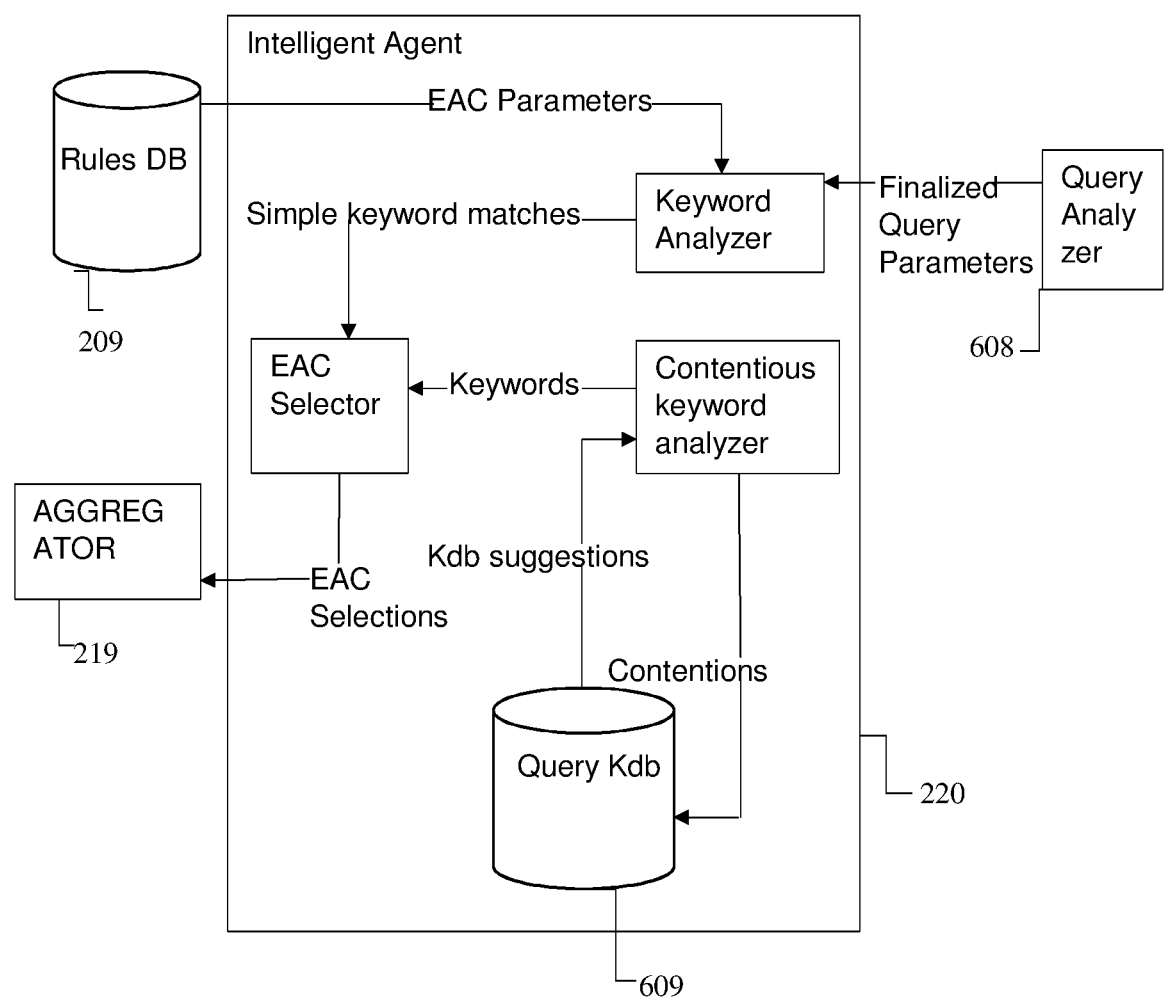
FIG. 9 depicts the working of the intelligent agent according to an embodiment of the present disclosure.
Figure 10:
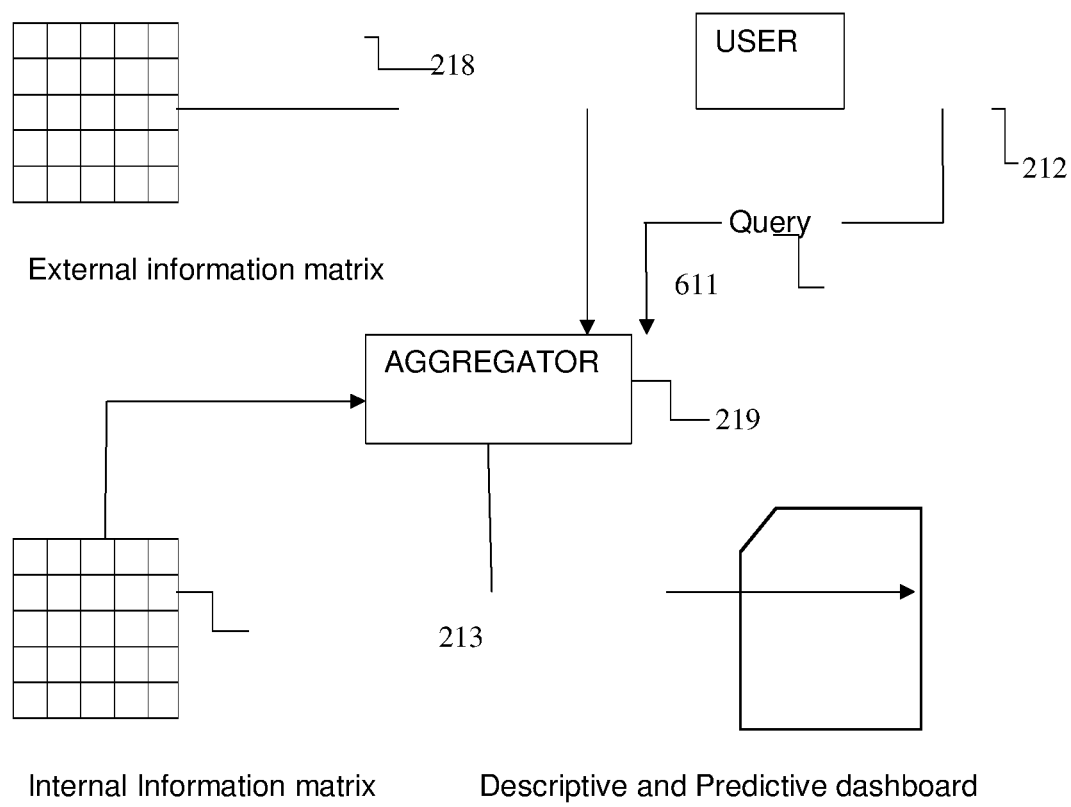
FIG. 10 depicts a black box type data flow of the aggregator module according to an embodiment of the present disclosure.

One of the other very important component of the Query Engine 211 is the Intelligent Agent 220 further depicted in FIG. 9, which makes sense of the input parameters filtered and formalized by the Query Analyzer (as shown in FIG. 7) and selects from the EACs for relevance both from the external technology development data as well as internal intellectual property portfolio data. The query engine further employs the Query KDB 609 to utilize past experience, while also adding to the learning from the current exercise. The selected EAC and related data are then fed to Aggregator 219 where external technology development data is aggregated with the internal Intellectual property portfolio data and results are passed on to a analytics module 208 for appropriate presentation.

It is also a self-learning and self-improving module as depicted in FIG. 7 that stores knowledge from the past usages, for which it employs a Query Knowledge Database (query KDB) 609 and corresponding self-learning engine.

In the query analyzer 608 input free form text entered by the user Is captured and analyzed for search purposes. The query analyzer module 608 analyzes the text and extracts keywords and creates the appropriate context and corresponding scores.

The query KDB 609 is the important component of the self-learning capability that stores relevant data and Improves its output over time. The Query analyzer module 608 provides its initial analysis to the query KDB 609 which matches this with past records.

The method of matching employs the similar approach mentioned earlier about keywords matching and context matching with existing records on the query KDB 609. Close matches that score more than 50% are selected for suggestions. The user is offered to choose from all available suggestions or maintain the originally entered text. The user is the final authority in finalizing the query and hence determining the query parameters that are then further fed to the Intelligent Agent 220.

Once the data flowing from external sources and internal intellectual property portfolio DB 603 and 604 is sorted into EAC data schemas, the next challenge a person skilled In the art would face Is to combine these data in a meaningful way based on the input query of the user of this system.

The query entered by the user is parsed and using known method of natural language processing (NLP) key words are derived from it. The NLP engine may run entity specific rules stored in the rule engine.

The EAC database 603 and 604 is scouted with these keywords used in combinations. To reduce search throughput time, the present disclosure implements a method, wherein instead of searching all the EACs, the system 100 determines the most relevant EACs for an input query based on keywords and search would be performed only in the relevant EAC. For each data set (data unit) the search would be conducted and a "relevancy" score would be generated based on the similarity with the input query.

In one embodiment, for an input query "Big data in India by 2018", a data set which has all India and Big data and 2018 would generate a score of 1. Whereas another data set which has just Big data and India may generate a lesser score. The scoring pattern can be customized according to the needs of the entity. Moreover various other parameters may be configured to add weightage to the score, for example, proximity among the occurrence of the keywords, sequence of occurrence etc. Thus once the search process is completed, there a numeric relevancy score is computed (or obtained) against each data set of external technology development data and Internal Intellectual property portfolio data in each EAC.

Below is an illustrative example that describes one of the ways of using these relevancy scores to combine the most relevant data sets and display them to the user as descriptive data.

Two matrices are defined: Matrix EXTD and Matrix PORTD. The matrix PORTD comprises N number of columns wherein N denotes the number of types of intellectual property that are present in the internal portfolio of the entity. For an organization which has patents, copyrights and trademarks in internal portfolio, PORTD would have 3 columns.

A 4×3 PORTD matrix:

PATENT COPYRIGHT TRADEMARK $$\begin{bmatrix} 0.9 & 1.0 & 0.4 \\ 0.6 & 0.9 & 0 \\ 0.5 & 0.6 & 0 \\ 0.4 & 0 & 0 \end{bmatrix}$$

Now for a given query, the system 100 generates "relevancy score" for each IP asset. The entity may predefine a cutoff (or threshold) score or there may be a dynamic cutoff. The scores for each patent is populate in the matrix in a descending manner. Similarly for each copyright and trademark the scores are filled up. The number of rows of the matrix Is determined by the cut off score. For cells with no entries, 0 is entered by default. Thus a person skilled in the art would understand that PORTD matrix necessarily need not be a square matrix.

Now after the population of the PORTD matrix, the system 100 next populates EXTD matrix. The number columns of the EXTD matrix are equal to the number of rows of the corresponding PORTD matrix for the same query. For population of EXTD matrix the system 100 generates relevancy score of all data sets In the selected EACs against the same input query. Then those relevancy scores are populated row wise in an descending manner i.e. row 1 column 1, row 1 column 2, row 1 column 3, row 2 column 1, row 2 column 2 . . . row n column n, and row m column n.

Now after both the matrices are populated, they are then multiplied resulting in efficient combination of data from 2 sources, i.e., EXTD×PORTD, to obtain an output matrix AGGD Matrix.

The multiplication can be depicted as:

$$\begin{array}{cc} EXTD & PORTD \\ \begin{bmatrix} ED1 & ED2 & ED3 \\ ED4 & ED5 & ED6 \\ ED7 & ED8 & ED9 \end{bmatrix} \times & \begin{bmatrix} P1 & CR1 & TM1 \\ P2 & CR2 & TM2 \\ P3 & CR3 & TM3 \end{bmatrix} \end{array}$$

Wherein ED1, ED2 . . . EDn are the relevancy score against a given query for external technology development data set 1, external technology development data set 2 . . . , external technology development data set n and P1, CR1, TM1 are relevancy score against a given query for internal portfolio patent 1, copyright 1, trademark 1 . . . patent n, copyright n, trademark n.

AGGD $$\begin{bmatrix} (ED1 \times P1) + (ED2 \times & (ED1 \times CR1) + (ED2 \times & (ED1 \times TM1) + (ED2 \times \\ P2) + (ED3 \times P3) & CR2) + (EDR \times CR3) & TM2) + (ED3 \times TM3) \\ (ED4 \times P1) + (ED5 \times & (ED4 \times CR1) + (ED5 \times & (ED4 \times TM1) + (ED5 \times \\ P2) + (ED6 \times P3) & CR2) + (ED6 \times CR3) & TM2) + (ED6 \times TM3) \\ (ED7 \times P1) + (ED8 \times & (ED7 \times CR1) + (ED8 \times & (ED7 \times TM1) + (ED8 \times \\ P2) + (ED9 \times P3) & CR2) + (ED9 \times CR3) & TM2) + (ED9 \times TM3) \end{bmatrix}$$

Thus each cell in the AGGD matrix is an aggregate score of corresponding external technology development data relevant score and internal IP portfolio data relevant score. The system 100 can dynamically generate a cutoff score or entity can have a predefined cut off score. All the cells with score higher than cut off score are selected for descriptive output.

In another embodiment, addition of the matrixes PORTD and EXTD may be executed for aggregating these two kinds of data and the structure of these two matrixes have to be changed dynamically to allow such an addition. Moreover other methods of matrix aggregation may also be employed.

Thus in the output descriptive dash board, the system 100 displays the external technology development data and internal intellectual property portfolio data corresponding to the cell of AGGD matrix.

In one embodiment, suppose a news item is mined by the system—"Big data and IOT are big things in India in 2015". Here the key data points are "Big Data", "IOT", "Big things", "India" and "2015".

The system 100 would dissimilate the data in the following way:

All mined items would be processed by the Rule Engine 207 for identification of input type as either EAC, measures, dimensions, score/value, etc.

Big data and IOT terms would be recognized as EAC Items and would be directly mapped with key words of respective EACs. Hence the data would be an entry to both Big Data and IOT Schemas.

India and 2015 would be recognized as measures in a table in each of the EAC schema.

Based on the word "Big things" a score would be generated and that numerical would be added in the table rows corresponding to India and 2015. The scoring rule will depend on the EAC and dimensions. For example "big thing in India" would be scored differently from "big thing globally", which in most cases would be higher in value than in the Indian context, again defined by the rule database 209.

This score would be cumulative for all such entries In Big data and IOT schemas. That is, scores would be considered cumulatively for the particular dimensions and EACs during analysis.

Through similar data received from across the whole spectrum of inputs, it may so happen that in the Indian context Big Data has a score of 2000, whereas in a particular user entity's context a similar score comes out as 100. It may be construed thus, that the entity, given its overall presence in the market and given number of similar players in the market needs to boost it Big Data capability to stay relevant in the particular technology.

Now suppose a user of the system (CEO of an Indian IT company) Inputs a query

"Should I invest in competency development in Big Data?"

The query engine 211 would break down this input to key data points "Big Data", "Competency", "invest".

"Big Data" being an EAC schema would have data and scoring for all external technology development data as well as for internal intellectual property portfolio data (Internal IP portfolio mapping to EAC and scoring is done in background in regular intervals irrespective of any input query).

Now the score of external technology development data for "Big Data" would be compared and aggregated with Internal Intellectual property portfolio data score of Big Data. The system 100 would analyze this score along with the data elements and generate descriptive and predictive analysis. The descriptive information would include the statistical representation of the comparative status of the entity with respect to the external technology development data set filtered by any user provided dimensions such as timeframe or geography and the like.

Figure 8:
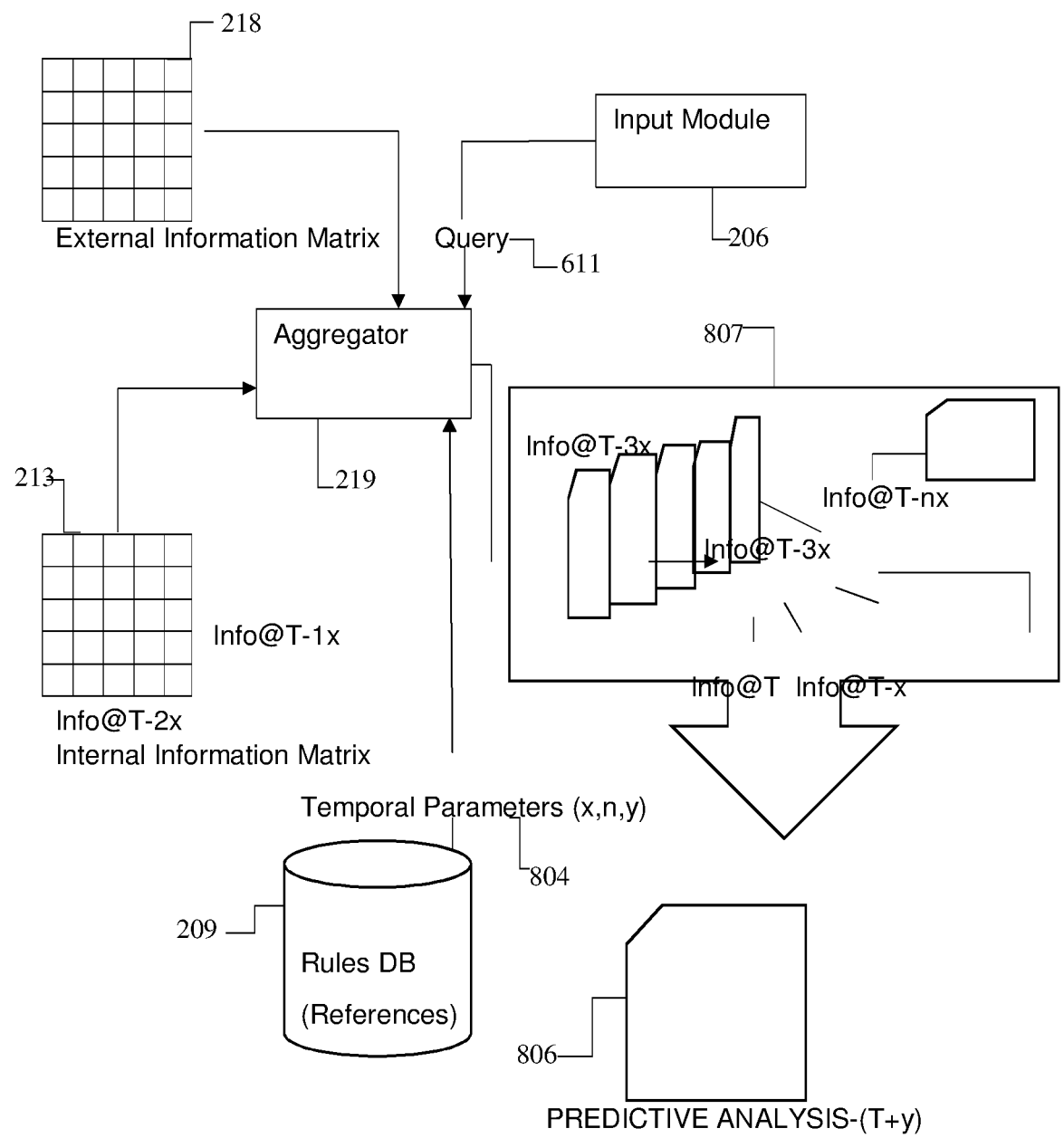
FIG. 8 depicts mechanism Involved behind generation of predictive dashboard according to an embodiment of the present disclosure.

FIG. 8 depicts mechanism involved behind generation of predictive dashboard according to an embodiment of the present disclosure. Predictive information would involve a trend analysis of the above descriptive data both external technology development data 218 as well as internal intellectual property portfolio data 213, over a predefined and configurable period of time to be retrieved from the Rule DB 209. An exercise of extrapolative analysis Is performed to predict the situation over a period of time that is also referenced and configurable or is overridden by user through input module 206 during execution of the query 611. This may result in predictive information 806 generated and displayed on the dashboard. Only a temporal predictive analysis 807 is used and spatial prediction may be considered as an extension. This is represented in FIG. 8. "T" is the descriptive information at the current time of the query. "x" is the period by which regular snapshots of information Is gathered backwards in time, as represented by T-x, T-2x, T-3x, etc. Such snapshots are extended to "n" times back in time. The output dashboard predicts an extrapolated data which is of a period y in the future. The values of "x", "n" and "y" are all configurable in the rule database.

While the dashboard 210 presented to the user 212 will present the descriptive and predictive analysis of data considered, the user 212 would also be presented a view of all internal intellectual property portfolio data and external technology development data inputs that had been considered to perform the analysis. This would give the user 212 a sense of confidence of all considerations made to arrive at the result, rather than be presented with only the end result. The user 212 will be able to configure the system 100 at a time of the users choice, so that the view of internal considerations is not displayed, which is usually when a certain level of confidence is attained after using the system 100 for a length of time. In one embodiment the user 212 may query the system 100 to know "What % of Big data patents has XYZ company filed with respect to Indian IT companies?"

In the descriptive output of this in the dashboard, there would be 1 measure (%) and several dimensions (Big data, patents, XYZ Company, filed, Indian, IT, companies). To achieve a predictive analysis, a temporal prediction may be presented by considering the trend of the measure over a period of time for example; in the case of IT companies a period of 5 years. Based on the trend, an extrapolation would be applied considering trends of other IT companies bound by the same set of dimensions, over a period of 2 years in the future and presented to the user. Spatial and other kinds of predictive analysis are not being considered in this be ignored as it may be deemed non-applicable in this scenario based on the context.

The preceding description has been presented with reference to various embodiments. Persons having ordinary skill in the art and technology to which this application pertains will appreciate that alterations and changes In the described structures and methods of operation can be practiced without meaningfully departing from the principle, spirit and scope.

What is claimed is:

1. A hardware processor implemented method for generating strategic competitive intelligence data relevant for an entity, the method comprising:

storing, in an internal portfolio database, internal intellectual property data of the entity;

receiving, by a data mining module, technology development data from one or more predefined sources and intellectual property data from the internal portfolio database;

storing, in an entity rule database, a set of rules relevant for the entity, wherein the set of rules are generated in real-time to identify and retrieve only relevant content from the predefined sources;

executing, by a rule engine, the set of rules;

filtering, by the data mining module, the technology development data and the intellectual property data, based on, the set of rules executed by the rule engine;

automatically populating, in at least one entity aligned cluster database, the filtered technology development data and the filtered intellectual property data, wherein each entity aligned cluster database corresponds to a predefined entity aligned cluster, wherein each entity aligned cluster database includes multiple tables for capturing data pertaining to a particular entity aligned cluster, wherein each entity aligned cluster is customizable according to an entity requirement and hybridized by including both technology and business data, wherein each entity aligned cluster database consists of predefined matrices with dimensions and measures as data fields, wherein the filtered technology development data and the filtered intellectual property data is segregated into the measures and attributes, and wherein the filtered technology development data and the filtered intellectual property data are categorized into particular entity aligned clusters depending on the segregation and predefined keywords associated with the entity aligned clusters as configured in a rule database;

executing, by a query engine, an input search query received from a user, wherein the query engine incorporates a self-learning capability to store relevant content from past usages and a self-improving capability to improve execution of the input search query over time, wherein the query engine employs a query knowledge database for utilizing past experience for the self-learning capability, and wherein the query knowledge database is a component of the self-learning capability to store relevant data, wherein the query search engine conducts a search, based on the set of rules, by:
a first level of search restriction by implementing one of whitelist of websites to search and blacklist of websites to ignore search;
filtration of entity aligned clusters based on context matching to identity at least one relevant entity aligned cluster for executing the input search query, wherein the context matching is achieved by matching a context stored in the rule database to text of the input search query, wherein the context is matched to the text by word matching and combination and sequence matching, wherein a scoring process is utilized in context matching to determine a strength of the context matching and to identify a relevant entity aligned cluster in context of the input search query, wherein the combination and sequence matching is performed by detecting each combination of words as they appear in the rule database and capturing occurrence of detection of each combination of words in the scoring process, and wherein the word matching is performed by detecting each word match in the rule database and capturing a word match count in the scoring process;

a second level of search performed only in the identified at least one relevant entity aligned cluster, based on keywords, to reduce a search throughput time;

populating, by an aggregator, relevancy scores in a first matrix specific to internal intellectual property data (PORTD matrix) and a second matrix specific to technology development data (EXTD matrix), based on output of said query engine, for each unique data set in a predetermined entity aligned cluster database;

aggregating, by the aggregator, the relevancy scores using the EXTD matrix and the PORTD matrix and generating output data (AGGD matrix), wherein each cell in the AGGD matrix includes an aggregate score by combining a relevancy score from the EXTD matrix and relevancy score from the PORTD matrix;

analyzing, by an analytics engine, the AGGD matrix based on the set of rules, wherein output of the analytics engine is data describing the output data of the aggregator and predicting strategic competitive intelligence data relevant for the entity, wherein the data describing the output data is derived from the analysis upon comparing the aggregated scores with a dynamically generated cut off score, wherein each cell in the AGGD matrix with an aggregate score higher than the dynamically generated cutoff score is selected for the data describing the output data, wherein the strategic competitive intelligence data relevant for the entity is predicted by a trend analysis of technology development data and internal intellectual property data by performing extrapolative analysis over a predefined and configurable period of time gathered backwards in time from a current time of the input search query, wherein the extrapolative analysis involves temporal prediction over the future and spatial prediction is used as an extension to the temporal prediction; and displaying, by a display unit, the output of the analytics engine.

2. The method of claim 1, wherein the intellectual property data comprises of patent data, copyright data, design data, trademark data, trade secret data and geographical indication data.

3. The method of claim 1, wherein the technology development data comprises of published patent documents, published technology related intellectual property documents, scientific and technology journal publications, technological product data.

4. The method of claim 1, wherein said one or more predefined sources comprises of at least one of blogs, news feeds, audio, video websites, company reports, intellectual property database websites, and social media.

5. The method of claim 1, wherein the technology development data and the intellectual property data are received by the data mining module are generated by a method selected from a group consisting of crawling, by a web crawler through World Wide Web, receiving RSS feeds directly from a website, receiving, by an input module, any relevant data provided by an user, or any combination thereof.

6. The method of claim 1, wherein the receiving, by a data mining module, is performed periodically based on an interval defined by said entity and stored in the entity rule database.

7. The method of claim 1, wherein a number of columns of the PORTD matrix is equal to a number of types of intellectual property present in the internal portfolio database and a number of columns of the EXTD matrix is equal to a number of rows of the PORTD matrix.

8. A system for generating strategic competitive intelligence data relevant for an entity, the system comprising:

a memory storing instructions;

a processor communicatively coupled to said memory, wherein said processor is configured by said instructions to:

store, in an internal portfolio database, internal intellectual property data of the entity;

receive, by a data mining module, technology development data from one or more predefined sources and intellectual property data from the internal portfolio database;

store, in an entity rule database, a set of rules relevant for the entity, wherein the set of rules are generated in real-time to identify and retrieve only relevant content from the predefined sources;

execute, by a rule engine, the set of rules;

filter, by the data mining module, the technology development data and the intellectual property data, based on, the set of rules executed by the rule engine;

automatically populate, in at least one entity aligned cluster database, the filtered technology development data and the filtered intellectual property data, wherein each entity aligned cluster database corresponds to a predefined entity aligned cluster, wherein each entity aligned cluster database includes multiple tables for capturing data pertaining to a particular entity aligned cluster, wherein each entity aligned cluster is customizable according to an entity requirement and hybridized by including both technology and business data, wherein each entity aligned cluster database consists of predefined matrices with dimensions and measures as data fields, wherein the filtered technology development data and the filtered intellectual property data is segregated into the measures and attributes, and wherein the filtered technology development data and the filtered intellectual property data is categorized into particular entity aligned clusters depending on the segregation and predefined keywords associated with the entity aligned clusters as configured in a rule database;

execute, by a query engine, an input search query received from a user, wherein the query engine incorporates a self-learning capability to store relevant content from past usages and a self-improving capability to improve execution of the input search query over time, wherein the query engine employs a query knowledge database for utilizing past experience for the self-learning capability, and wherein the query knowledge database is a component of the self-learning capability to store relevant data, wherein the query search engine conducts a search, based on the set of rules, by: the entity rule database includes a first level of search restriction by implementing one of whitelist of websites to search and blacklist of websites to ignore search;

filtration of entity aligned clusters based on context matching to identity at least one relevant entity aligned cluster for executing the input search query, wherein the context matching is achieved by matching a context stored in the rule database to text of the input search query, wherein the context is matched to the text by word matching and combination and sequence matching, wherein a scoring process is utilized in context matching to determine a strength of the context matching and to identify a relevant entity aligned cluster in context of the input search query, wherein the combination and sequence matching is performed by detecting each combination of words as they appear in the rule database and capturing occurrence of detection of each combination of words in the scoring process, and wherein the word matching is performed by detecting each word match in the rule database and capturing a word match count in the scoring process;

a second level of search performed only in the identified at least one relevant entity aligned cluster, based on keywords, to reduce a search throughput time;

populate, by an aggregator, relevancy scores in a first matrix specific to internal intellectual property data (PORTD matrix) and a second matrix specific to technology development data (EXTD matrix), based on output of said query engine, for each unique data set in a predetermined entity aligned cluster database;

aggregate, by the aggregator, the relevancy scores using the EXTD matrix and the PORTD matrix and generating output data (AGGD matrix), wherein each cell in the AGGD matrix includes an aggregate score by combining a relevancy score from the EXTD matrix and relevancy score from the PORTD matrix;

analyze, by an analytics engine, the AGGD matrix based on the set of rules, wherein output of the analytics engine is data describing the output data of the aggregator and predicting strategic competitive intelligence data relevant for the entity, wherein the data describing the output data is derived from the analysis upon comparing the aggregated scores with a dynamically generated cut off score, wherein each cell in the AGGD matrix with an aggregate score higher than the dynamically generated cutoff score is selected for the data describing the output data, wherein the strategic competitive intelligence data relevant for the entity is predicted by a trend analysis of technology development data and internal intellectual property data by performing extrapolative analysis over a predefined and configurable period of time gathered backwards in time from a current time of the input search query, wherein the extrapolative analysis involves temporal prediction over the future and spatial prediction is used as an extension to the temporal prediction; and display, by a display unit, the output of the analytics engine.

9. The system of claim 8, wherein the intellectual property data comprises of patent data, copyright data, design data, trademark data, trade secret data and geographical indication data.

10. The system of claim 8, wherein the technology development data comprises of published patent documents, published technology related intellectual property documents, scientific and technology journal publications, technological product data.

11. The system of claim 8, wherein said one or more predefined sources comprises of at least one of blogs, news feeds, audio, video websites, company reports, intellectual property database websites, and social media.

12. The system of claim 8, wherein the technology development data and the intellectual property data is received by the data mining module are generated by a method selected from a group consisting of crawling, by a web crawler through World Wide Web, receiving RSS feeds directly from a website, receiving, by an input module, any relevant data provided by an user, or any combination thereof.

13. The system of claim 8, wherein the receiving, by a data mining module, is performed periodically based on an interval defined by said entity and stored in the entity rule database.

14. The system of claim 8, wherein a number of columns of the PORTD matrix is equal to a number of types of intellectual property present in the internal portfolio database and a number of rows of the EXTD matrix is equal to a number of columns of the PORTD matrix.

\* \* \* \* \*